US011030159B2

(12) United States Patent
Cometto et al.

(10) Patent No.: US 11,030,159 B2
(45) Date of Patent: Jun. 8, 2021

(54) SYSTEM AND METHODS FOR IMPLEMENTING A SERVER-BASED HIERARCHICAL MASS STORAGE SYSTEM

(71) Applicant: Microsoft Technology Licensing, LLC, Redmond, WA (US)

(72) Inventors: Maurilio Cometto, Redwood City, CA (US); Gururaj Pangal, Pleasanton, CA (US); Ady Degany, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/393,945

(22) Filed: Apr. 24, 2019

(65) Prior Publication Data

US 2019/0310969 A1    Oct. 10, 2019

Related U.S. Application Data

(62) Division of application No. 13/898,152, filed on May 20, 2013, now Pat. No. 10,552,385.

(60) Provisional application No. 61/649,305, filed on May 20, 2012.

(51) Int. Cl.
*G06F 16/182* (2019.01)
*G06F 3/06* (2006.01)
*G06F 9/4401* (2018.01)
*G06F 13/38* (2006.01)

(52) U.S. Cl.
CPC .......... *G06F 16/182* (2019.01); *G06F 3/0605* (2013.01); *G06F 3/0649* (2013.01); *G06F 3/0685* (2013.01); *G06F 9/4411* (2013.01); *G06F 13/385* (2013.01)

(58) Field of Classification Search
CPC ..................................................... G06F 16/182
USPC .......................................................... 707/639
See application file for complete search history.

(56) References Cited

U.S. PATENT DOCUMENTS

| 5,155,835 | A | * | 10/1992 | Belsan | G06F 3/0601 |
| | | | | | 711/113 |
| 5,313,631 | A | * | 5/1994 | Kao | G06F 12/122 |
| 5,355,475 | A | * | 10/1994 | Tanaka | G06F 3/0601 |
| | | | | | 707/829 |
| 5,495,457 | A | * | 2/1996 | Takagi | G11B 17/228 |
| | | | | | 369/30.03 |
| 5,584,018 | A | * | 12/1996 | Kamiyama | G06F 3/0601 |
| | | | | | 711/112 |
| 5,893,139 | A | * | 4/1999 | Kamiyama | G06F 12/122 |
| | | | | | 711/113 |
| 5,978,815 | A | * | 11/1999 | Cabrera | G06F 3/0626 |

(Continued)

OTHER PUBLICATIONS

"Office Action Issued in European Patent Application No. 13793195.2", dated Aug. 7, 2019, 6 Pages.

*Primary Examiner* — Sheree N Brown
(74) *Attorney, Agent, or Firm* — Newport IP, LLC; Benjamin Keim

(57) ABSTRACT

Setting up and supporting the computer infrastructure for a remote satellite office is a difficult task for any information technology department. To simplify the task, an integrated server system with a hierarchical storage system is proposed. The hierarchical storage system includes the ability to store data at an off-site cloud storage service. The server system is remotely configurable and thus allows the server to be configured and populated with data from a remote location.

20 Claims, 26 Drawing Sheets

(56) References Cited

U.S. PATENT DOCUMENTS

| | | | | |
|---|---|---|---|---|
| 7,831,682 B2* | 11/2010 | Certain | ............... | G06F 11/1451 |
| | | | | 709/214 |
| 8,055,622 B1* | 11/2011 | Botes | ................... | G06F 16/181 |
| | | | | 707/640 |
| 8,452,932 B2* | 5/2013 | Pangal | ............... | G06F 11/1456 |
| | | | | 711/162 |
| 8,578,108 B2* | 11/2013 | Jennas, II | ............. | G06F 3/0685 |
| | | | | 711/162 |
| 8,612,705 B2* | 12/2013 | Gold | .................. | G06F 11/1453 |
| | | | | 711/162 |
| 9,189,421 B2* | 11/2015 | Testardi | .............. | G06F 12/0808 |
| 9,372,809 B2* | 6/2016 | Testardi | .............. | G06F 11/1448 |
| 2006/0010169 A1* | 1/2006 | Kitamura | .............. | G06F 3/0685 |
| 2010/0306174 A1* | 12/2010 | Otani | .................. | G06F 11/1464 |
| | | | | 707/640 |
| 2011/0040729 A1* | 2/2011 | Ito | ........................... | G06F 3/067 |
| | | | | 707/654 |
| 2011/0167221 A1* | 7/2011 | Pangal | ................... | G06F 3/065 |
| | | | | 711/117 |
| 2012/0272236 A1* | 10/2012 | Baron | .................. | G06F 9/4416 |
| | | | | 718/1 |
| 2012/0278553 A1* | 11/2012 | Mudhiganti | .......... | G06F 3/0647 |
| | | | | 711/114 |
| 2013/0054528 A1* | 2/2013 | Saika | ................... | G06F 3/0619 |
| | | | | 707/638 |

* cited by examiner

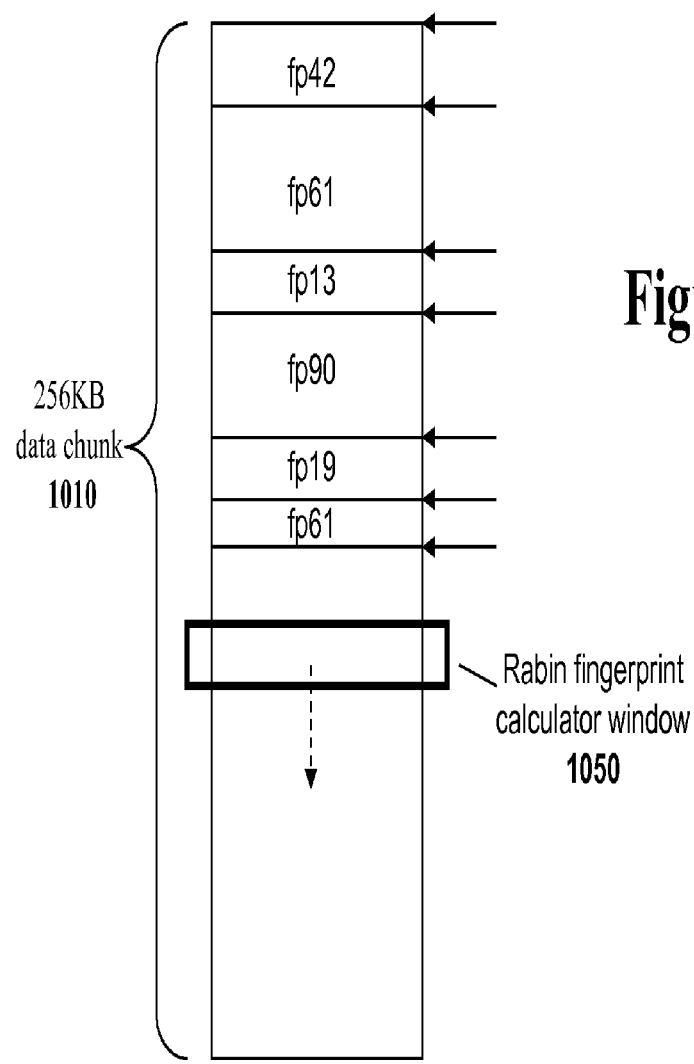

| Compression Information 1115 | Compressed data slice 1110 |
|---|---|

Figure 11A

| Encryption Information 1125 | Encrypted data slice 1120 | |
|---|---|---|
| | Compression Information 1115 | Compressed data slice 1110 |

Figure 11B

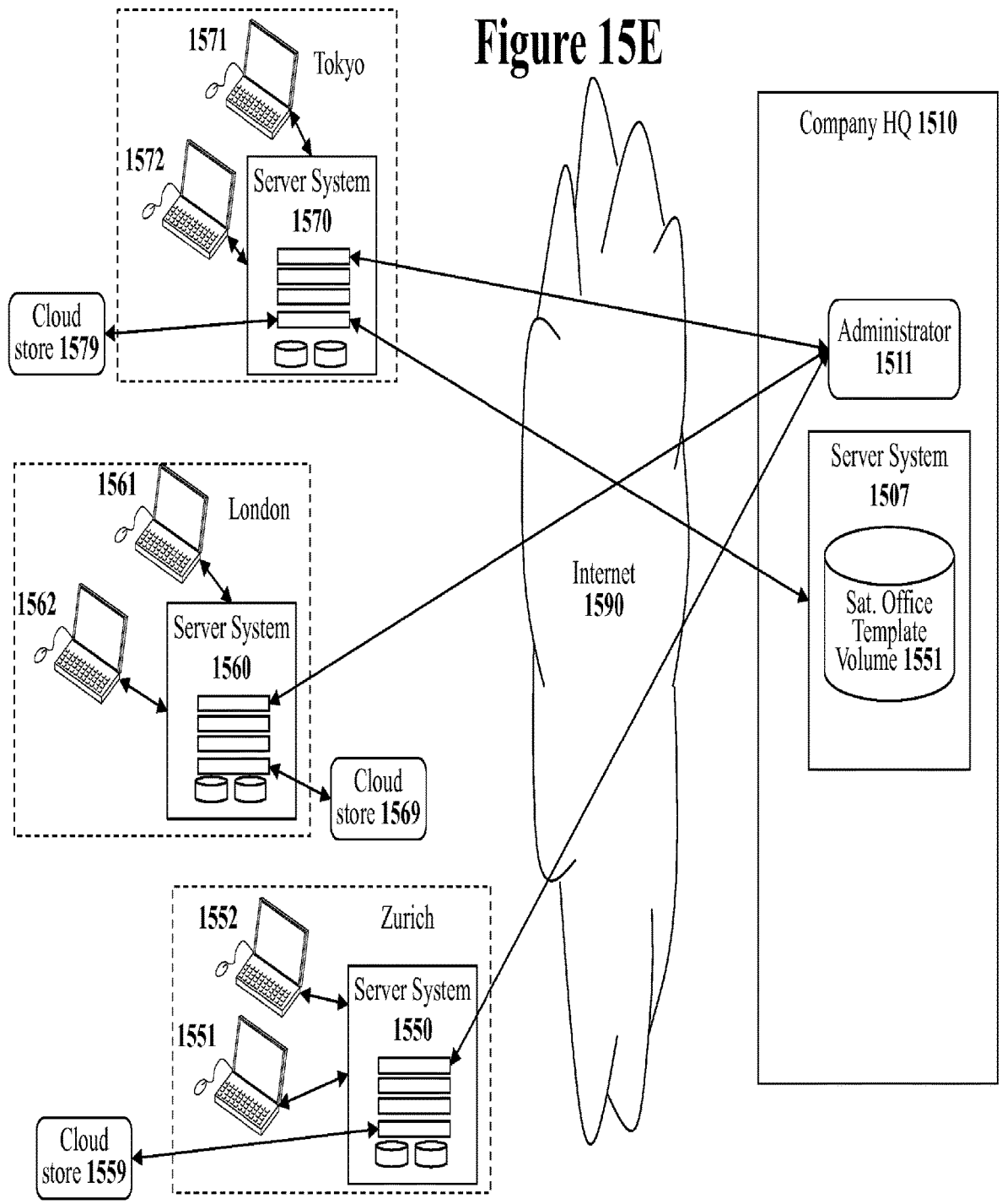

SYSTEM AND METHODS FOR IMPLEMENTING A SERVER-BASED HIERARCHICAL MASS STORAGE SYSTEM

RELATED APPLICATIONS

The present patent application claims the benefit of the previously filed provisional patent application entitled "System And Methods For Implementing A Server-Based Hierarchical Mass Storage System" filed on May 20, 2012 having Ser. No. 61/649,305 and of the previously filed non-provisional patent application entitled "Systems And Methods For Implementing A Server-Based Hierarchical Mass Storage System" filed on May 20, 2013 having Ser. No. 13/898,152, both of which are hereby incorporated by reference. The present application further incorporates by reference the previous US. Patent Applications entitled "System and Method for Efficiently Creating Off-Site Data Volume Back-Ups" filed on Apr. 1, 2010 having Ser. No. 12/798,321 and "System And Method For Storing Data Off Site" filed on Jan. 6, 2011 having Ser. No. 12/930,502.

TECHNICAL FIELD

The present invention relates to the field of digital mass storage systems. In particular, but not by way of limitation, the present disclosure teaches several techniques for implementing hierarchical mass storage system within a server system or in cloud-based virtual machine.

BACKGROUND

Computer systems have become an indispensable tool used in modern life. Nearly every business and government entity is now dependent upon computer systems for digital communication, project planning, document creation, information storage, transaction processing, project management, inventory management, financial operations, and a large number of other mission critical services.

Due to the critical importance of information technology to most organizations, it is critical to be able to repair or replace any part of the information technology infrastructure that fails. Although individual pieces of computer hardware and computer software can easily be replaced by an entity by purchasing new computer equipment or computer software, the entity's accumulated store of digital information cannot easily be replaced. Thus, digital information storage and digital information protection is one of the most critical parts of any modern information technology infrastructure system.

Modern organizations need to be able to support a wide variety of different computer environments for their computer users. An information technology department may be required to provide digital information storage services to a large central headquarters campus, other geographically remote campuses, remote divisional offices, regional development offices, small remote sales offices, and even individuals that work alone. Ideally, all of these different sized office environments could be provided with the same level of information technology services and support. Furthermore, the information technology department must deal with the fact that new offices open, existing offices close, and offices may move during an organization's lifetime. Providing digital information storage services to such a wide variety of office environments that may include geographically remote offices is a significant challenge to any information technology department. Therefore, it would be desirable to develop a scalable digital information storage system that can provide easily manageable and high-quality digital information storage services to handle any type of computer environment.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 10 is a conceptual diagram that illustrates how a chunk of data may be divided into data slices using a progressive fingerprint calculated over a moving window.

FIG. 11A illustrates a block diagram of a data slice that has been compressed with an extendible compression system.

FIG. 11B illustrates a block diagram of the compressed data slice of FIG. 11A that has been encrypted with an extendible encryption system.

FIG. 15E illustrates the diagram of FIG. 15D with the Tokyo office operating.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to a hierarchical data storage system implemented within a Microsoft Windows based server system; the same techniques may be implemented with other. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
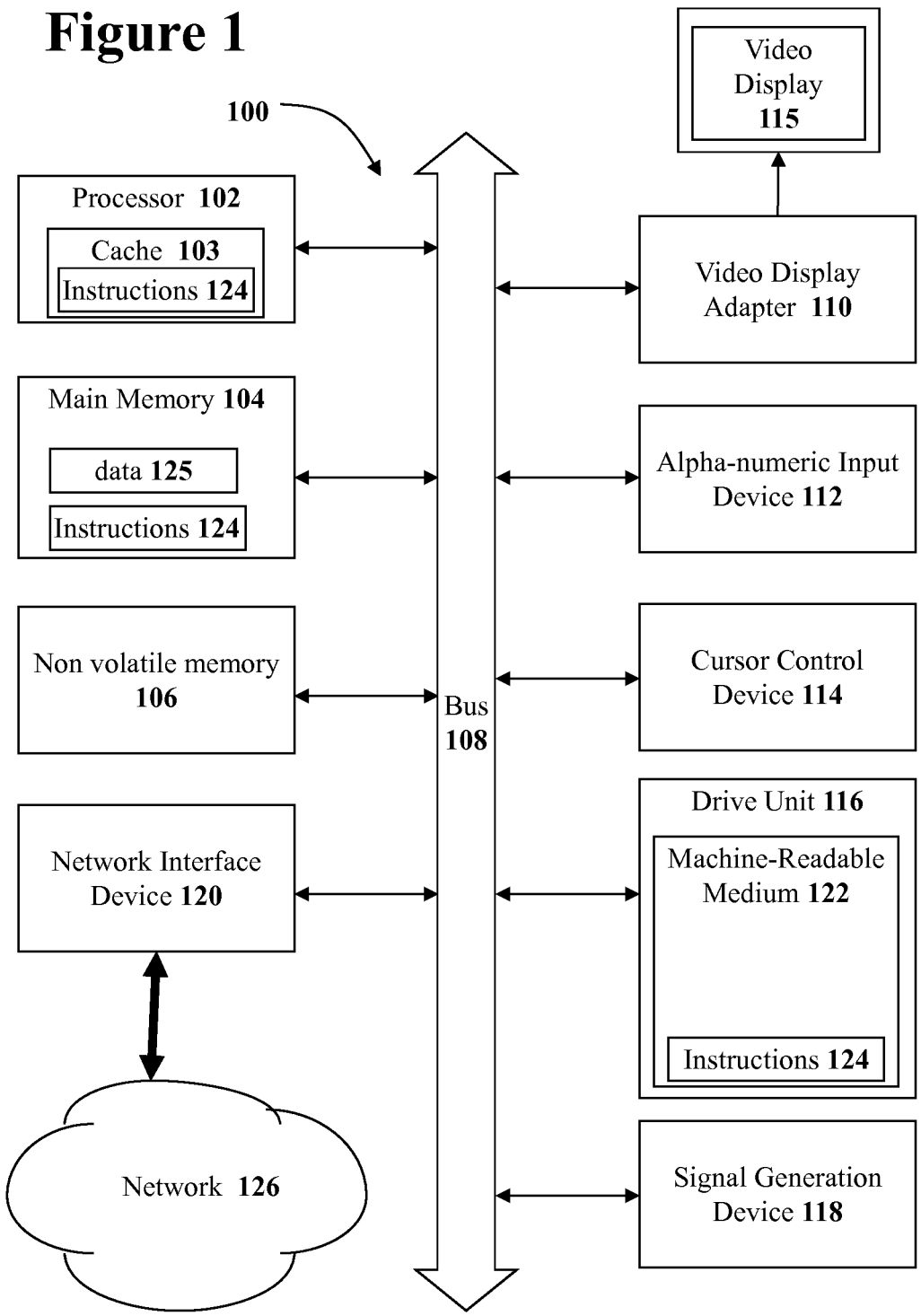
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both) and a main memory 104 and a non-volatile memory 106, which communicate with each other via a bus 108. The non-volatile memory 106 may comprise flash memory and may be used either as computer system memory, as a file storage unit, or both. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the cache memory 103 associated with the processor 102 also constitute machine-readable media.

The instructions 124 may further be transmitted or received over a computer network 126 via the network interface device 120. Such transmissions may occur utilizing any one of a number of well-known transfer protocols such as the well-known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers)

that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, battery-backed RAM, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Storage Area Networks

To make enterprise data centers more efficient, the concept of a storage area network (SAN) was introduced. A SAN allows computer applications to access remote computer storage devices (such as hard disk arrays, magnetic tape libraries, and optical disc storage devices) in a manner wherein the remote storage devices appear no different than locally attached storage devices. The use of a SAN allows multiple applications and servers to share storage systems. The use of shared storage simplifies storage system administration since fewer storage systems need to be maintained. SANs also simplify the task of creating disaster recovery systems for computer systems since an independent secondary storage system located at a distant location can be used to replicate the data being stored on a primary storage system at a primary location.

A storage area network generally operates as an integrated part of the operating system in a computer device. Specifically, the operating system provides the basic file system for handling files and the SAN operates below the file system and only provides raw logical block storage services to the file system. The difference between a traditional direct access storage system and a SAN is illustrated in FIG. 2.

Figure 2:
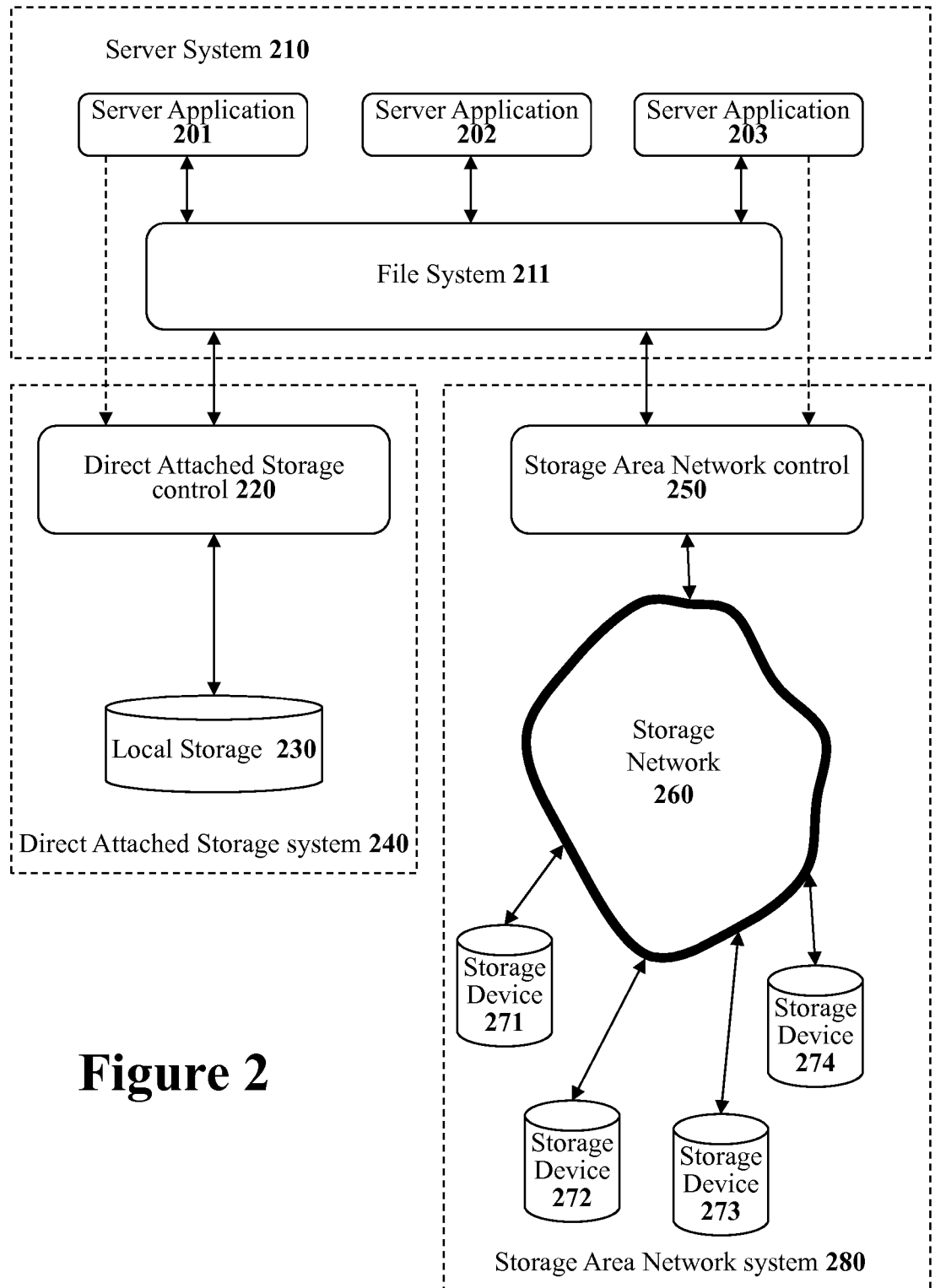
FIG. 2 illustrates a block diagram illustrating the difference between a traditional direct access storage system and a storage area network (SAN).

Referring to FIG. 2, several server applications (201, 202, and 203) are running on a server system 210. The server applications (201, 202, and 203) will generally operate on data files using the file system 211 of server system 210. The server applications may also bypass the file system 211 to read and write raw data blocks directly to storage. In a computer system with a traditional direct attached storage system 240, the file system 211 accesses a direct attached storage controller 220 to access a local storage system 230. To use a storage area network (SAN) system 280, the file system 211 accesses a storage area network controller 250 instead of accessing a local storage device. The storage area network controller 250 issues storage requests on the storage area network 260 to storage devices (271, 272, 273, and 274). Server applications that bypassed the file system 211 to directly use the direct attached storage system 240 may similarly bypass the file system 211 to directly access the SAN controller 250.

With the storage area network system 280, additional storage devices can easily be added to the storage area network 260 as necessary. By decoupling server systems from their storage components, a malfunctioning server system (such as server 210) can be quickly replaced with a new server system that can immediately access the data for that server which is available on the storage area network system 280. Similarly, if a storage device on the storage area network 260 malfunctions, that individual storage device can be replaced.

Hierarchical Mass Storage System Overview

Many different digital storage technologies have been created to store digital data. Each different digital storage technology tends to have its own advantages and disadvantages in terms of performance metrics, costs, power consumption, noise, reliability, etc. An ideal digital storage system would provide extremely high performance at an extremely low cost. However, high performance storage technologies tend to be expensive and consume power. Thus to store very large amounts of data, lower cost data storage technologies must be used.

Figure 3:
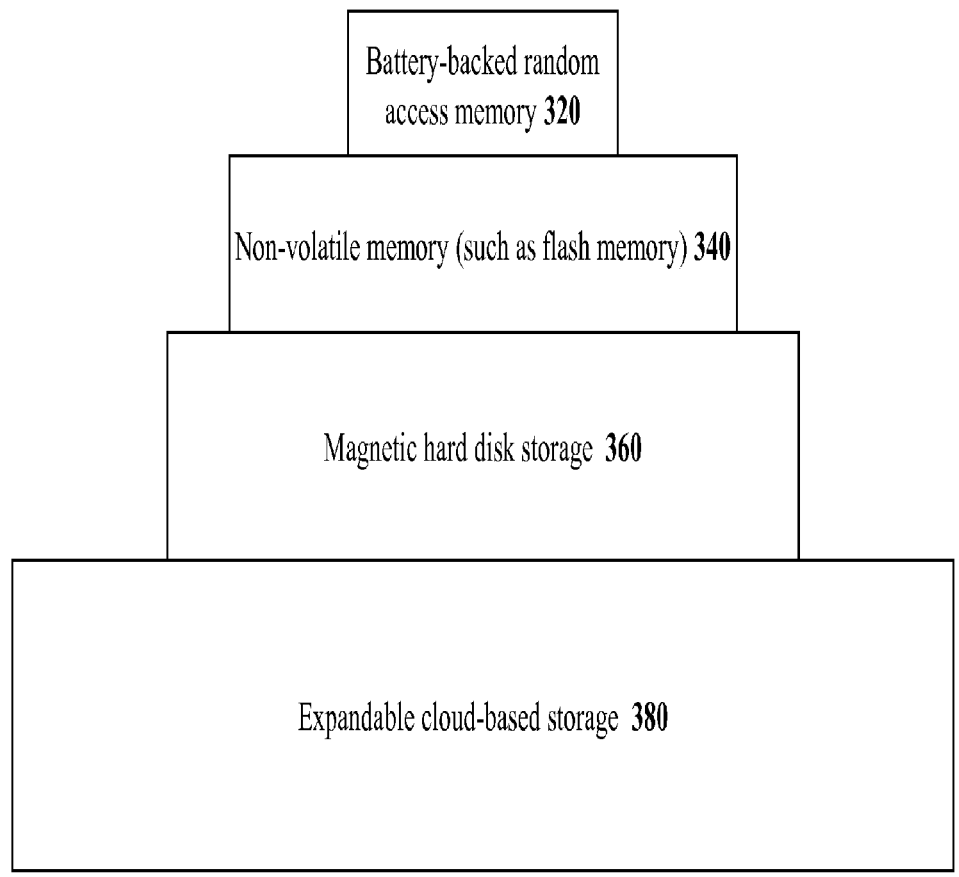
FIG. 3 illustrates a conceptual view of a hierarchical storage system wherein frequently accessed data is stored near the top and less frequently data is stored near the bottom.

Users do not use access all stored data equally. Generally, a small of amount of "active" stored data is frequently accessed while most stored data is rarely ever accessed. One can take advantage of this data access usage pattern by constructing hybrid storage systems that use various different data storage technologies in a hierarchical manner. For example, FIG. 3 illustrates a conceptual view of one possible hierarchical storage system embodiment wherein frequently accessed data is stored near the top and less frequently data is stored near the bottom.

At the top of the hierarchical storage system is a small amount of battery-backed random-access memory 320 that can very quickly handle data storage requests but is very expensive and consumes power. A user's most frequently accessed data may be stored in the battery-backed random-access memory area 320 that has the lowest latency response time. The next level is a non-volatile solid-state memory layer 340 such as flash memory. The non-volatile solid-state memory layer 340 may use less power than the battery-backed random-access memory 320 but tends to operate at a slower speed. Beneath the non-volatile solid-state memory layer 340 is a magnetic hard disk storage layer 360. The magnetic hard disk storage layer 360 can be used to store massive amounts of data on an inexpensive magnetic data storage medium but the latency performance is generally slower than the two preceding layers 320 and 340. Finally, an expandable cloud-based storage layer 380 can be used to provide ever-expanding amounts of data storage. However, since an external network must be used to access the cloud-based storage, the cloud-based storage layer 380 will not provide quick data access service.

Figure 4:
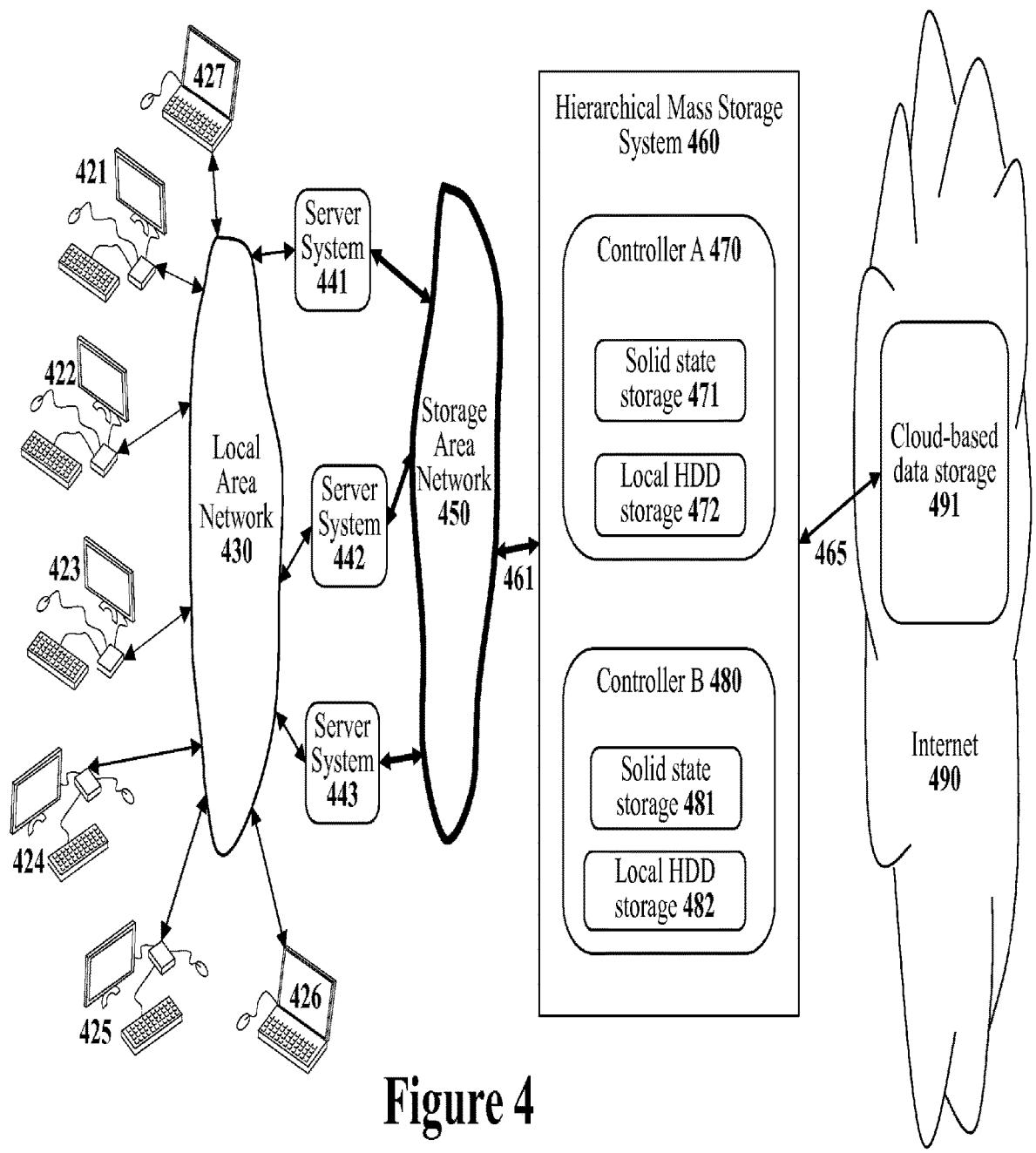
FIG. 4 illustrates a hierarchical mass storage system used within the computer network system of an office environment.

The present document discloses several techniques for implementing various different types of hierarchical mass storage systems that provide data storage services in a in various different types of environments. The hierarchical mass storage system combines together several data storage technologies in a manner that takes advantage of the strengths and weaknesses of each different data storage technology. FIG. 4 illustrates one example of a hierarchical mass storage system 460 for use within an office environment. The hierarchical mass storage system 460 combines together solid-state storage, hard disk storage, and even a cloud-based data storage system 491 to create a synergistic data storage system for a local storage area network 450.

The hierarchical mass storage system 460 may be used to provide mass data storage services to a typical networked computer environment. Referring to FIG. 4, a typical networked computer environment has multiple user workstations (421 to 427) coupled to a local area network (LAN) 430. The LAN 430 also has multiple server systems (441, 442, and 443) that provide various services to the users at the workstations (421 to 427). Typical server system applications include an email server for sending and receiving email messages, a database server for storing specific structured data, and file server for storing general user files. The various server systems (441, 442, and 443) are coupled to the hierarchical mass storage appliance 460 on a storage area network 450. The storage network interface 461 on the hierarchical mass storage appliance 460 uses standard storage area network protocols to provide data storage services to the local server systems (441, 442, and 443).

The hierarchical mass storage system 460 uses storage technologies such as solid-state memory (471 and 481) and hard disk storage (472 and 482) in hierarchical manner to store data locally. In one embodiment, the solid-state memory (471 and 481) may be implemented with a non-volatile memory technology such as flash memory. Flash memory systems are generally faster, use less power, output less noise, and are more reliable than hard disk drive (HDD) storage systems. The HDD storage (472 and 482) can provide very large amounts of local storage for a low price per bit stored. The hierarchical mass storage system 460 may also be coupled to a cloud-based storage system 491 through a second interface using an interne connection 465 in order to take advantage of the benefits of a remote cloud-based data storage service 491.

The use of a storage area network (SAN) interface 461 on the hierarchical mass storage system 460 allows administrators to use the hierarchical mass storage system 460 like a conventional SAN storage device. Multiple server systems may share the hierarchical mass storage system 460 using the standard storage area network 450. The use of a second interface 465 coupled to a cloud storage provider 491 allows the hierarchical mass storage system 460 to provide additional storage resources that can be used as needed. As set forth in an earlier section, storage area networks allow administrators to decouple the data storage function away from server systems such that only a single unified data storage system needs to be maintained. Thus, all of the server systems (441, 442, and 443) may be coupled to storage area network 450 that is used to handle raw data storage reads and writes. A single hierarchical mass storage system 460 coupled to the storage area network 450 may handle data storage operations for the entire storage area network 450. (Note that additional hierarchical mass storage systems or conventional storage devices may also be coupled to the storage area network 450 for additional storage capacity.)

In the particular embodiment of FIG. 4, the hierarchical mass storage system 460 includes two different controller units: controller A 470 and controller B 480. These two different controller units may be used to provide a fault-tolerant mirrored storage system wherein either controller can take over if the other controller fails. Alternatively, the two controllers (470 and 480) may be used to "statically load balance" data volumes so that the controllers are each servicing half of the data storage requests when both controllers are healthy thereby increasing performance. When either controller fails in such a configuration, the remaining functioning controller takes on double workload, slowing down to some degree but providing continuous storage service for all of the data volumes.

Controller unit A 470 and controller unit B 480 may each have local data storage systems. In the embodiment of FIG. 4, each controller has solid-state memory storage (471 and 481) and hard disk-based storage (472 and 482). The local data storage systems handle all data write requests from the server systems (441, 442, and 443). The local data storage systems also handles data read operations for data that is currently stored in the local data storage systems.

To supplement the local data storage systems, the hierarchical mass storage system 460 may also use data storage provided by a cloud-based data storage system 491 available on the internet 490. In hierarchical mass storage systems that take advantage of cloud-based storage system 491, the hierarchical mass storage system 460 attempts to keep all frequently accessed data within the local data storage systems such that the vast majority of read operations are handled locally within the hierarchical mass storage system 460. However, when the amount of stored data exceeds the capacity of the local data storage systems the hierarchical mass storage system 460 will begin to store less frequently accessed data at the cloud-based data storage system 491. This allows the hierarchical mass storage system 460 to take advantage of an infinitely large storage system that is maintained by experts that run the cloud-based data storage system 491 while having local storage performance for frequently accessed data (the data stored in the local data storage systems).

As illustrated in FIG. 4, a hierarchical mass storage system 460 that uses cloud-based data storage acts as an intermediary between an on-site SAN 450 and an off-site cloud-based data storage provider 491. Thus, the hierarchical mass storage system 460 must reconcile the significant differences between the front-end interface 461 to SAN 450 and the back-end 465 interface to the cloud-based data storage system 491. One significant difference is the speed differential since the SAN 450 generally operates at very fast speeds (such as one gigabit per second) and the internet connection 465 may only operate at ten megabits per second.

To compensate for the speed differential, the hierarchical mass storage system 460 takes advantage of the manner in which data storage systems are generally used. Most mass data storage systems only need to handle a relatively small amount of dynamic data that is frequently accessed as set forth with reference to FIG. 3. For example, an email server needs to store new email messages every day and a file server needs to handle a limited number of files that are actively being accessed by users. However, the vast majority of the data stored on a mass storage system is generally static and rarely accessed. For example, file servers may store archives of old documents that are no longer being accessed regularly. Thus, since only a relatively small amount of data stored in mass data storage system is actively used, that small amount of active data can be stored in the local data storage systems (solid state storage 471 and 481 and local HDD 472 and 482) that can be repeatedly accessed at a high data rate and with low latency. The data that is rarely accessed can be stored at the cloud-based data storage provider 491 and retrieved only when necessary. Accessing data from the cloud-based data storage provider 491 will often result in increased latency; however, such latency may be acceptable in certain applications or use patterns. Furthermore, such latency should rarely be encountered since only rarely-used data will be stored at the cloud-based data storage provider 491.

A core concept of the hierarchical mass storage system 460 is the efficient use of the local data storage available within the hierarchical mass storage system 460. As long as the hierarchical mass storage system 460 accurately identifies the data that is most frequently accessed and keeps that frequently-accessed data in the local data storage (471, 481, 472 and 482) then the vast majority of storage requests (both read operations and write operations) received on the SAN interface 461 can be serviced using only the local data storage systems (471, 481, 472 and 482). This will greatly reduce the amount of data traffic on the interface 465 to the cloud-based data storage 491 thus hiding the speed differential between the two interfaces from users of the hierarchical mass storage system 460.

To most efficiently use the local storage, the hierarchical mass storage system 460 uses both intelligent data-tiering algorithms and storage space optimization techniques. The data-tiering algorithms are used to identify the most frequently accessed data and keep that frequently accessed data in the local storage system. The data-tiering algorithms may also use intelligent buffering systems like read-ahead caching to prevent cache misses. For example, by using heuristics to identify data that is likely to be requested soon, the hierarchical mass storage system 460 may issue predictive requests for data currently stored at the cloud-based data storage 491 before receiving an actual incoming request for such data. Various storage space optimization techniques may be used to store as much data in the local storage space. The techniques that may be used include the identification and elimination of duplicated data and data compression.

In one embodiment, the administrator of the hierarchical mass storage system 460 may be allowed to allocate and configure data storage in an application dependent manner. For example, if a particular application uses a certain set of data infrequently but a low latency response is needed when that data is accessed then an administrator may be allowed to specify this limitation for that application or for that specific data set. In this manner, the hierarchical mass storage system 460 will ensure that a local copy exists or will pro-actively fetch from the cloud and move it to the local storage if previously tiered to the cloud-based storage 491. Other data sets may be explicitly marked as 'archive' data such that the designated archive data is quickly sent off to the cloud-based storage provider 491. This prevents such archive data from using valuable local storage space until the data-tiering system eventually determines that such archive data is not being frequently accessed. In one embodiment, the hierarchical mass storage system may allow an administrator to designate a data volume as a 100% local volume. The hierarchical mass storage system 460 will ensure that such a designated 100% local volume will be stored in some combination of local storage.

Hierarchical Mass Storage System Architecture

Figure 5:
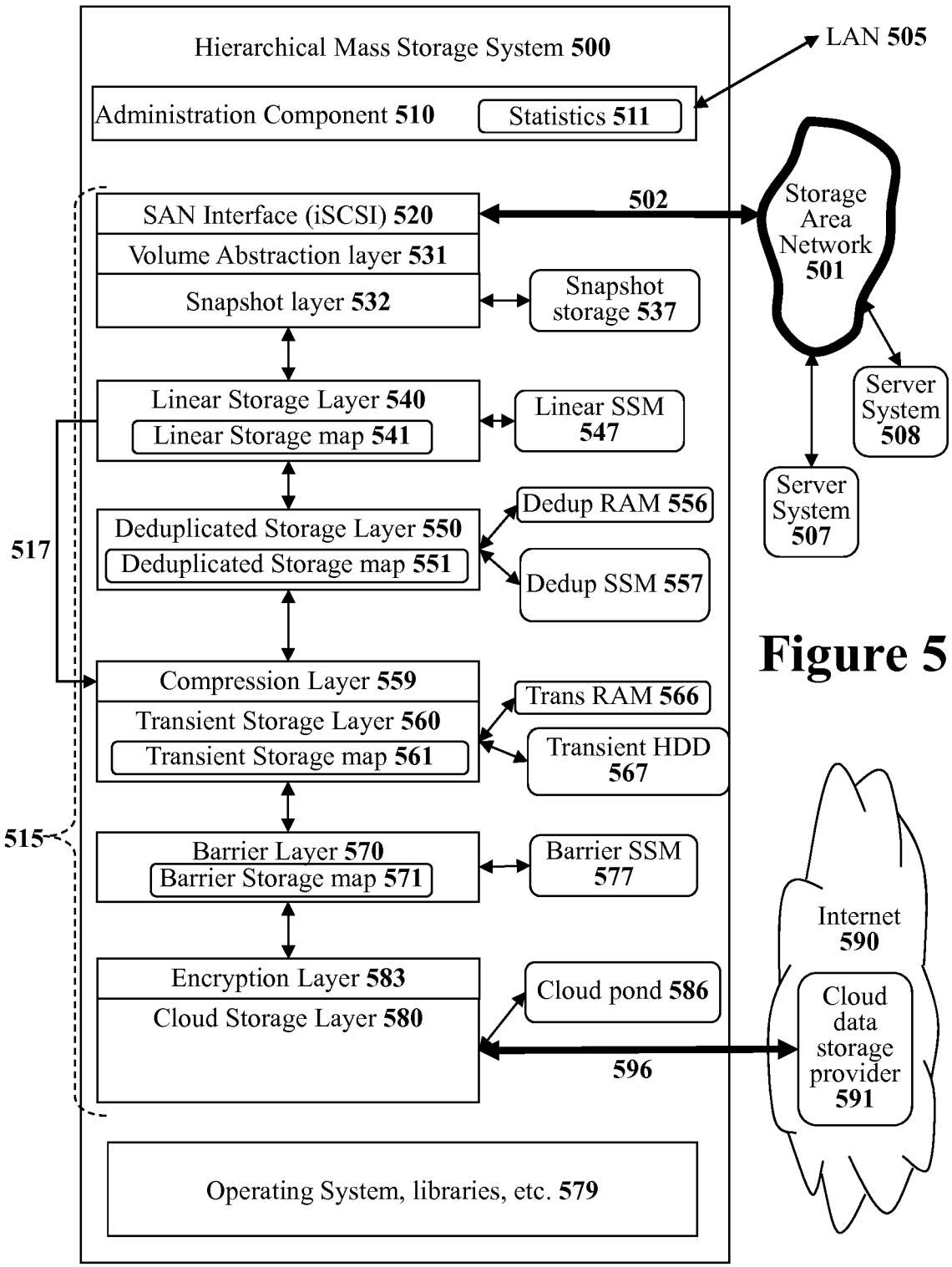
FIG. 5 illustrates a conceptual block diagram of one embodiment of an architecture used to construct a hierarchical mass storage system.

Various different architectures may be used to construct the hierarchical mass storage system 460 of FIG. 4. FIG. 5 illustrates a conceptual block diagram of one particular architecture that may be used to construct a hierarchical mass storage system 500. At the top of the hierarchical mass storage system 500 block diagram is an administration component 510 that is used for configuring, controlling, and monitoring a hierarchical mass storage system 500. An administrator may access the administration component 510 through an interface coupled to a local area network 505.

An administrator uses the administration component 510 to initially configure the hierarchical mass storage system 500. For the initial configuration, an administrator specifies which virtual storage to expose to hosts on the storage area network (SAN) 501. This is similar to legacy systems where the administrator specifies which LUNs in a storage array to expose to hosts. The administrator also specifies the addresses and access information for the cloud storage provider(s) 591 that will be used. The administrator may specify a storage limit, but this is generally not advisable since the hierarchical storage system 500 should be allowed to grow as needed.

The administrator may also specify bandwidth constraints of the communication link 596 to the cloud data storage provider 591 and bandwidth constraints of the specific cloud data storage provider 591 (the maximum rate at which the cloud storage provider will handle data access requests). The bandwidth constraints of the communication link 596 can be used to ensure that the hierarchical mass storage system 500 does not attempt to send data faster than the communication link 596 can handle the data. Furthermore, if the communication link 596 is shared by other users (such as an internet connection shared with human users, mail servers, and other internet users), the hierarchical mass storage system 500 can be configured to use less than the full bandwidth available on the communication link 596.

After initial configuration, an administrator may use the administration component 510 for several different maintenance operations. For example, the administration component 510 may be used to schedule periodic snapshots of the data volumes in the hierarchical mass storage system 500 and make back-up copies of those snapshot volumes in the cloud-based storage. Additional data volumes may be added to the hierarchical storage system 500 or existing data volumes may be removed.

The administration component 510 will collect operation statistics 511 that may be used to measure the performance of the hierarchical mass storage system 500. The operation statistics 511 may be analyzed and used to alter the configuration of the hierarchical mass storage system 500 to improve performance. Each lower layer in the data storage request stack 515 may generate its own individual statistics. The administration component 510 may periodically poll the lower layers and various other parts of the hierarchical mass storage system 500 to create a centralized collection of all the hierarchical mass storage system statistics.

The main component of the hierarchical mass storage system 500 is a multi-layered data storage request stack 515 that handles all data storage requests issue to the hierarchical mass storage system 500. Data storage requests are received at the top of the data storage request stack 515 and the various data storage layers attempt to resolve the data requests. When a layer cannot fully resolve a request then that layer passes on a request to a lower layer until the data request is ultimately resolved. The details of the data storage request handling stack 515 will be disclosed layer by layer in later sections of this document.

The top layer of the data storage request stack 515 is a storage area network (SAN) interface layer 520 that is coupled through front-end interface 502 to a SAN 501. The SAN interface layer 520 receives storage requests from local systems such as servers 507 and 508. The front-end interface 502 of the hierarchical mass storage system 500 will generally use well-known SAN protocols. Examples of well-known SAN protocols include the industry standard Internet Small Computer System Interface (iSCSI) protocol and the Fiber Channel Protocol (FCP). These SAN protocols allow storage clients to perform operations such as start, stop, read, write, and format on data storage units addressed by logical unit numbers (LUNs).

The top layers (520, 531, and 532) of the data storage request handling stack 515 handle some formalities in processing storage requests. Beneath the formality layers are a set of hierarchical data storage layers. A first data storage layer, the linear storage layer 540, is optimized for quickly handling data requests by locally storing data in a relatively raw format. A second data storage layer, the deduplicated storage layer 550, locally stores data in a more efficient manner by identifying and eliminating duplicate data. A third data storage layer, the transient storage layer 560, is optimized for locally storing large amounts of data in a very dense compressed form. A fourth data storage layer uses cloud-based storage to store a limitless amount of data by storing data off site at a cloud-based data storage provider 591. Note that FIG. 5 only illustrates one possible hierarchical storage system and that other hierarchical storage systems may use additional or fewer data storage layers. To fully describe the data storage request handling stack 515 of FIG. 5, each the layers in the storage request handling stack will be described in further detail individually.

Front-End Interface and Initial Layers

At the top of the data storage request stack 515 is the storage area network (SAN) interface 520. In one particular implementation that will be considered in detail, the storage area network interface 520 implements the well-known iSCSI protocol that is used to accept SCSI commands carried on a TCP/IP network. However, any other data storage protocol may be implemented at the top of the storage request handling stack 515.

In an iSCSI embodiment, the SAN interface 520 exposes iSCSI volumes to hosts on the SAN 501. The SAN interface 520 then receives iSCSI data storage requests from the hosts and responds to those data storage requests. The SAN interface 520 parses iSCSI commands and determines how the commands should be handled. Many of the administrative iSCSI requests that are not directly related to reading and writing data can be fully handled by the SAN interface layer 520. The SAN interface layer 520 passes data storage requests down the data storage request stack 515 to the next layer to handle such data storage requests.

Beneath the storage area network interface layer 520 is a volume abstraction layer 531. The volume abstraction layer 531 handles many of the formalities in keeping track of the different volumes stored by the hierarchical mass storage system 500. For example, the volume abstraction layer 531 keeps track of the data volumes that exist, the size of each volume, access control lists (ACLs), and other administrative information. Thus, the volume abstraction layer 531 handles some of the volume management tasks such that the lower layers of the storage request handling stack 515 can concentrate on actual data storage.

Snapshot Layer

Beneath the volume abstraction layer 531 is a snapshot layer 532. The snapshot layer 532 is used for taking "snapshots" of specified data volumes in the hierarchical mass storage system 500 upon receiving a request for a snapshot. In the present disclosure, a snapshot is the state of a data volume at a particular moment in time. However, it is impractical (if not impossible) to instantly copy an entire data volume. Instead, the snapshot layer 532 creates a new volume that initially only consists of a time map for the snapshot volume that specifies when the snapshot was taken and a pointer to the parent volume. If there are no new writes to the parent volume, then the current data of that parent volume can be used as the data for the snapshot volume. However, when a new write operation is received that changes data in the parent volume that is referenced by a snapshot volume, the old existing data must be copied out of the parent volume and placed in the snapshot volume before the write occurs in order to save the data that existed when the snapshot volume was created. Detailed information on the snapshot layer 532 can be found the U.S. patent application entitled "System and Method for Efficiently Creating Off-Site Data Volume Back-Ups" filed on Apr. 1, 2010 having Ser. No. 12/798,321 which is hereby incorporated by reference.

High-Speed Linear Storage Layer

After performing any needed snapshot operations in the snapshot layer 532, a data storage request is then passed to the linear storage layer 540 that is first level of data storage in the hierarchical mass storage system 500. The linear storage layer 540 is high performance data storage layer designed to handle "hot" data. Hot data is defined as data that is frequently read and/or written.

The linear storage layer 540 will generally receive data storage requests addressed with traditional data storage semantic terms such as logical volumes, logical block addresses (LBA), and block transfer lengths (BTL). As set forth earlier, the front-end of the hierarchical mass storage system 500 may implement many different possible data storage protocols that use different data storage addressing systems. However, as long as the hierarchical mass storage system 500 properly responds to all data storage requests received, the hierarchical mass storage system 500 is free to use any different type of addressing system internally.

In one embodiment, the hierarchical mass storage system 500 uses a flat linear addressing system for each data volume wherein each logical volume is divided into fixed sized "chunks" that are an even multiple of the logical blocks (SCSI logical blocks are typically 512 bytes long) used by most disk-based storage systems. A very simple translation system can be used to translate data requests made in terms of logical block address (LBA) ranges on a disk (or any other data storage addressing system) into the chunk-based linear addressing system used within the linear storage layer 540. In one specific embodiment each fixed-size chunk is 256 kilobytes long (which can fit 512 logical blocks that are each 512 bytes long). However, this is merely one particular design choice and other sizes may be used.

The linear storage layer 540 stores data in an allocated linear storage area 547 of local data storage. In one embodiment, solid state memory such as flash memory is used to store all data for the linear storage layer 540. Flash memory can quickly handle storage requests and is nonvolatile such that the data will remain stored even if there is a power loss.

The linear storage layer 540 maintains a linear storage map 541 to keep track of where the all the data is stored. Specifically, for each data volume stored in the hierarchical mass storage system 500, the linear storage map 541 specifies where each chunk of data resides (and thus how the data may be obtained). For data chunks that are currently stored within the linear storage layer 540, the linear storage map 541 may specify a specific physical memory address in the linear data storage area 547. For all of the data that is not currently stored within the linear storage layer 540, the linear storage map 541 may specify a set of data fingerprints used to uniquely identify data slices stored within lower data storage levels of the data storage request stack 515. In one particular embodiment, a thirty-two-byte long SHA-256 fingerprint is used to uniquely identify data slices stored within the lower data storage layers.

Figure 6:
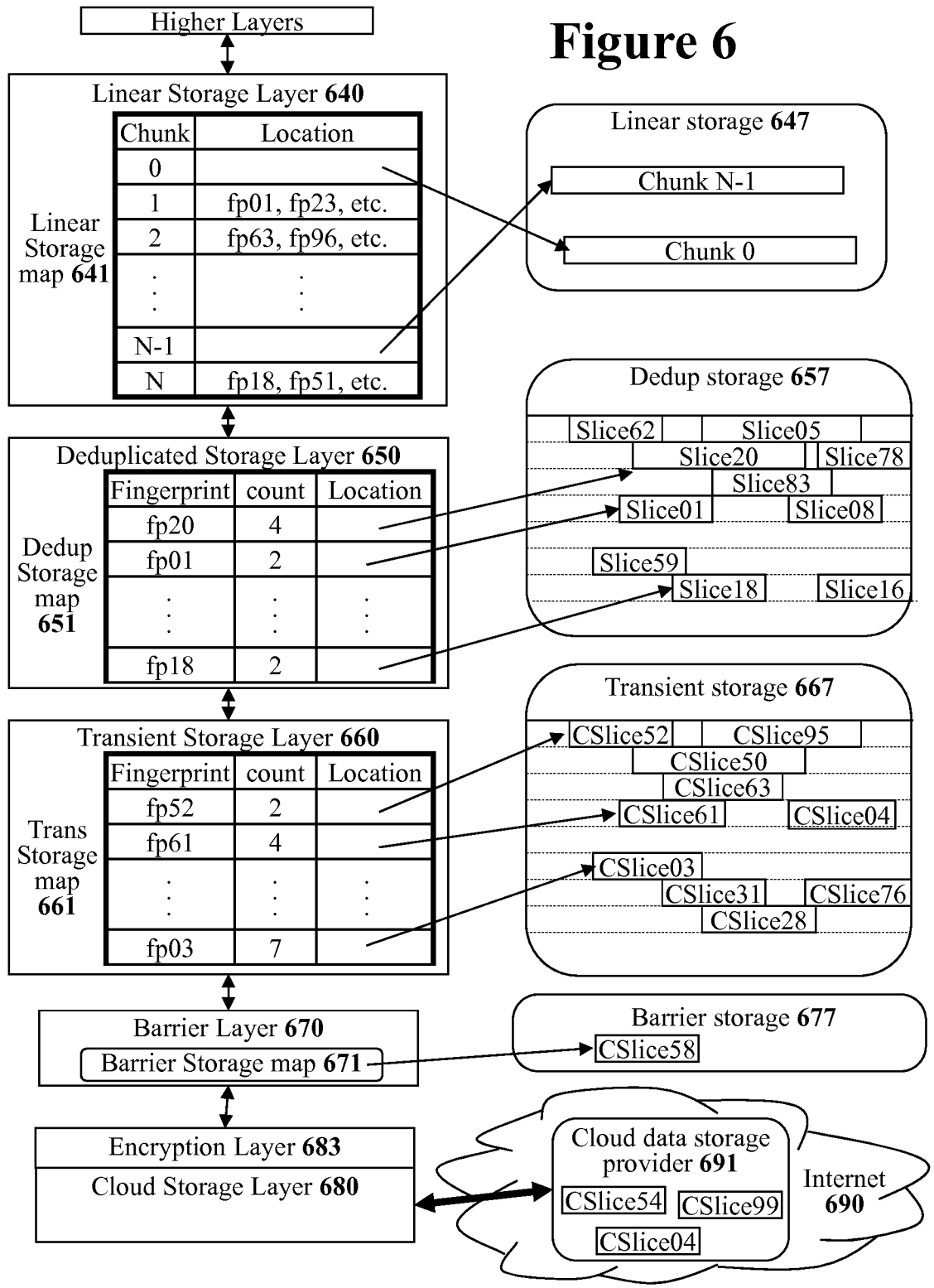
FIG. 6 conceptually illustrates a set of data storage layers in one embodiment of a hierarchical mass storage system.

FIG. 6 conceptually illustrates how the first three various data storage layers use the local data storage. Note that FIG. 6 is conceptual only and that many details are omitted for clarity. The linear storage layer 640 uses a linear storage map 641 that maps each data chunk either to a location in linear storage 647 or to a set of fingerprint identifiers that represent the data chunk. The fingerprint identifiers are used to locate the requested data in lower data layers of the storage request handling stack. In the example of FIG. 6, chunk 0 is stored in the linear storage area 647 as indicated by a pointer. Chunk 1 is stored in lower data storage layer(s) since the linear storage map 641 specifies a set of fingerprint identifiers. Each of the fingerprint identifiers uniquely specifies a data slice of the data chunk. The set of data slices is equal to the size of a data chunk (which is 256K in one particular embodiment).

The linear storage map 641 may be implemented with an ordered linked list that links together entries each containing a pointer to a chunk of data in the linear storage area 647 or a set of fingerprint identifiers for data slices stored in lower data storage layers. For the data stored in lower data storage layers, the linked list entries will contain a series of entries with data fingerprints where the total size of the data slices referred to by the fingerprint identifiers equals one chunk size. To improve performance, the linked list may be supplemented by additional data structures used to improve the search of the linked list. For example, a red-black tree, a hash table, or another similar data structure containing pointers to the linked list nodes may be used to improve the speed of searching the linked list.

Figure 7:
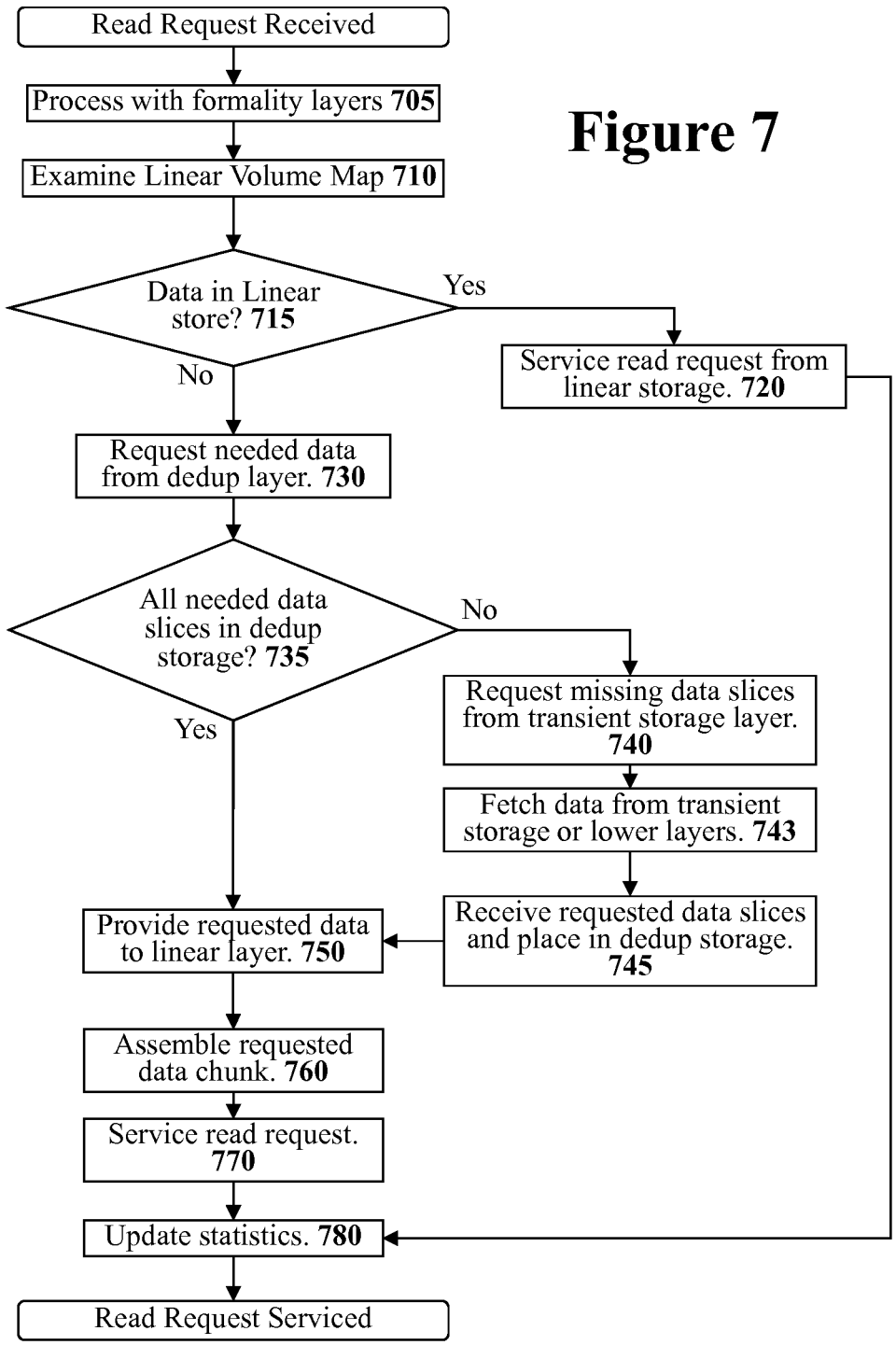
FIG. 7 illustrates a flow diagram that describes how a hierarchical mass storage system may respond to a read request received from a client system.

A description of how the linear storage layer 640 handles read requests will be disclosed with reference to a flow chart presented in FIG. 7 and the conceptual diagram of FIG. 6. Referring to FIG. 7, a read request received from a host client is first processed by the SAN interface layer, the volume abstraction layer, the snapshot layer, and any other initial layer at stage 705. The read request is then passed to the linear storage layer 640 to obtain the data.

The linear storage layer 640 first examines the linear storage map 641 for the requested data at stages 710 and 715 to determine how to respond to the read request. If the requested data is available in the linear storage 647 then the linear storage layer 640 simply reads the data from the linear storage area 647 and responds to the read request at stage 720. The system may then update some statistics (such as statistics used to determine if the data is hot, warm, or cold) at stage 780 and it is then done handling the read request.

If the requested data was not found in the linear storage 647 at stage 715, then the linear storage layer 640 requests the needed data from lower layers of the data storage request stack at stage 730. The request is made by requesting the fingerprints of the needed data slices. Note that a read request may only need a few data slices of data if the read request only requested a small amount of data within a particular chunk of data. In this particular embodiment, the next lower layer is the deduplicated storage layer 650 in FIG. 6. This document may use the term 'dedup' when referring to aspects the deduplicated layer.

At stage 735, the deduplicated storage layer 650 examines the deduplicated storage map 651 to determine if all the requested data slices are in the deduplicated storage area 657. If the deduplicated storage layer 650 has all the needed data slices, then the deduplicated storage layer 650 can respond with the requested data at stage 750. If the deduplicated storage layer 650 does not have all the requested data slices, then the deduplicated storage layer 650 will request the needed data slices from lower data storage layers at stage 740. In this particular embodiment, the request will be made to the next lower layer of the storage request handling stack, the transient storage layer 660.

At stage 743 the transient storage layer 660 handles the data request. Thus, the transient storage layer 660 examines the transient storage map 661. If the transient storage layer 660 has the requested data, then it returns that data. If the transient storage layer 660 does not have the requested data, then the transient storage layer 660 may request and receive the missing data from lower data layers. The system proceeds in this layered manner until at stage 745, the deduplicated storage layer 650 receives all of the requested data from the lower layers and places the requested data into the deduplicated storage area 657. The deduplicated storage layer 650 can then respond to the linear storage layer 640 with the requested data at stage 750.

Upon receiving the requested data slices from deduplicated storage layer 650, the linear storage layer 640 will assemble the requested data from the received data slices at stage 760. Finally, the linear storage layer 640 can then respond to the read request with the requested data at stage 770. The statistics counters can then be updated at stage 780.

It can be seen that servicing the read request at stage 720 will be faster than servicing the read request when the data must be fetched from the lower data storage layers. Furthermore, the lower the data layer that must be accessed, the more time that will be required to handle the read request.

Write requests are handled in a similar manner. All write operations to the hierarchical mass storage system are initially written into the linear storage 647 associated with the linear storage layer 640. The handling of a write request will be disclosed with reference to the flow chart of FIG. 8 and the conceptual diagram of FIG. 6. The example of FIG. 8 describes a write to a single data chunk. However, the same steps may be performed multiple times to handle writes to multiple data chunks.

Figure 8:
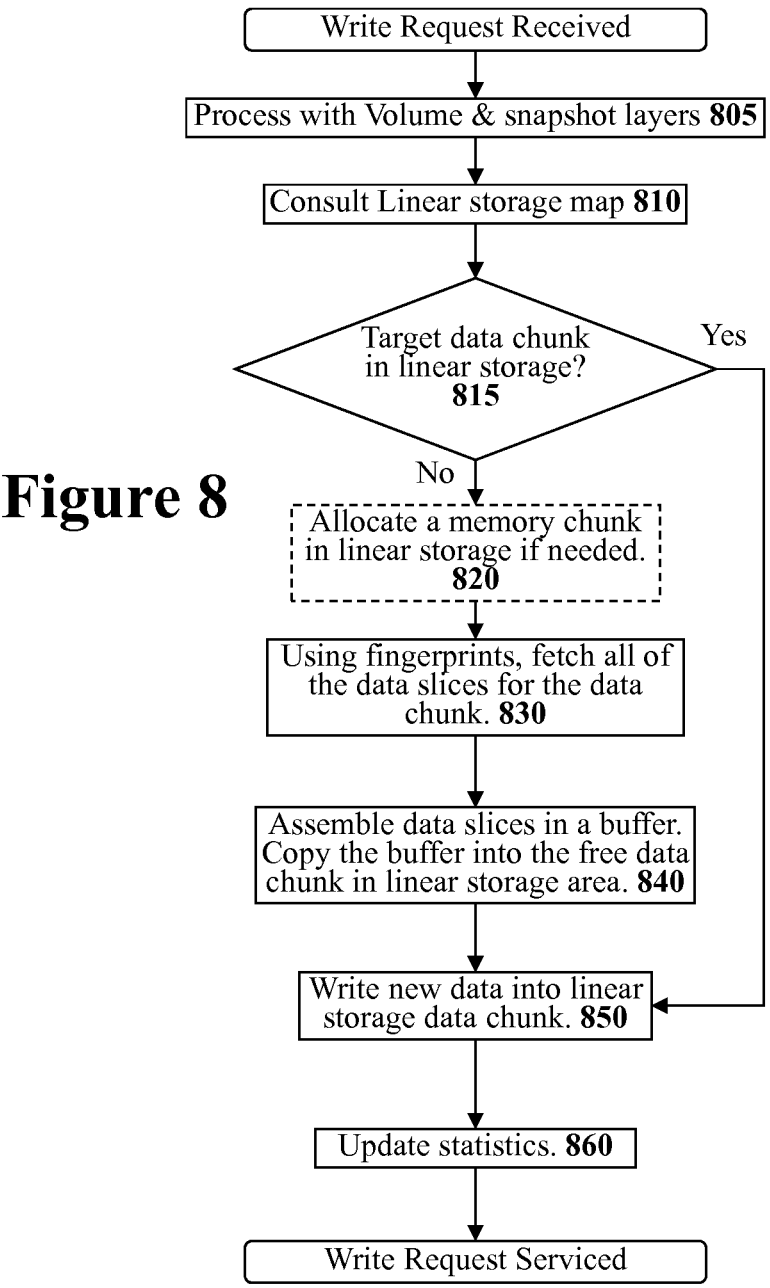
FIG. 8 illustrates a flow diagram that describes how a hierarchical mass storage system may respond to a write request received from a client system.

Referring to FIG. 8, a write request received from a host client is first processed by the initial formality layers such as the SAN interface layer, the volume abstraction layer, and the snapshot layers at stage 805. The write request is then passed to the linear storage layer 640 where the linear storage layer 640 first examines the linear storage map 641 at stages 810 and 815 to determine how to handle to the write request. If the write is directed at a data chunk that is already available in the linear storage area 647 then the write request is handled by proceeding to stage 850 and writing the new data into the appropriate data chunk within the linear storage area 647 at stage 850. The system may then also update some statistics at stage 860. At this point, the write request has been fully handled using only the linear storage layer 640.

If the data chunk that the write request is directed at was not found in the linear storage area 647 at stage 815, then the linear storage layer 640 will generally first pull the data for the target data chunk into the linear storage layer 640 to over write the existing data. The reason that data is pulled up into the linear storage layer 640 before it is overwritten is so that if a failure occurs during a write operation, the failure will at least leave the old data which has been partially overwritten by new data. This is the way that a traditional disk-based storage system operates such that application programs are already prepared to handle corrupted data due to such a failure occurring during a write operation.

To pull the target data up into the linear storage area 647, the linear storage layer 640 may first need to allocate a new chunk of memory in the linear storage area 647 at stage 820. (Generally, the system will always keep a few memory chunks available for handling new incoming write options.) Allocating a new memory chunk may be performed by spilling data from an existing chunk in the linear storage area 647 down to a lower data storage layer. Spilling a data chunk down to a lower data storage layer will be described in a later section of this document.

With a memory chunk available in the linear data storage area 647, the linear storage layer 640 then requests all the data slices for that data chunk from the lower data storage layers of the data storage request stack at stage 830. The request for the data slices is made by providing the fingerprint identifiers of the needed data slices. Note that all of the data slices for the data chunk being over-written are required since the entire data chunk will now be represented in the linear storage area 647 as a single data chunk. If the deduplicated storage layer 650 does not have all the needed data slices for the chunk in the deduplicated storage 657, then the deduplicated storage layer 650 will request the missing data slices from the next lower data storage layer of the data storage request stack (the transient layer 660 in this embodiment).

After receiving the requested data slices from the lower data storage layers, the linear storage layer 640 then assembles the data slices in a buffer at stage 840. The fully assembled data chunk is then copied into the free memory chunk in linear storage area 647 such that the linear storage layer 640 is now fully responsible for that particular data chunk. Thus, the linear storage layer 640 updates the linear storage map 641 to reflect that the linear storage layer 640 now has that particular chunk of memory represented within the linear storage area 647.

It should be noted that the fetched data slices will generally be allowed to also remain down in the deduplicated storage area 657. A primary reason that these data slices will continue to be in the deduplicated storage area 657 is that other areas of the data volume (or other data volumes) may refer to the same fetched data slices. If a data slice is not referenced by any data chunk, then a garbage collection mechanism may eventually discard that unreferenced data slice.

Unreferenced data slices may be allowed to remain in the deduplicated storage area 657 for some time. There is actually a benefit in keeping unused data slices in the deduplicated storage area 657 for a period of time. Specifically, a data chunk that was pulled up from the deduplicated storage layer 650 (or lower layers) up into the linear storage layer 640 may soon be spilled back down to the deduplicated storage layer 650. When this occurs, the pre-existing data slice in the deduplicated storage area 657 may be used again if the data slice still represents a portion of the data chunk.

Referring back to FIG. 8, after the data chunk has been fully moved back up into the linear storage area 647 and assembled at stage 840 the linear storage layer 640 may then over-write the data chunk at stage 850. In the unlikely event of a failure during the write, the data chunk will contain a mix of new data overwritten onto old data. As set forth above, this is a situation that existing application programs are already prepared to handle. Finally, at stage 860, the system may update some statistics. For example, a counter associated with the data chunk may be incremented to indicate that the data chunk has recently been accessed. This counter value may be used by a data-tiering algorithm to determine if the data chunk should be kept in the linear storage layer.

In most circumstances, the hierarchical mass storage system will only spill data down to lower data storage layers of the storage request stack when a particular storage layer needs evict old data to make room for new data. For example, the linear storage layer 640 may evict a data chunk to make room for new data in the linear storage area 647. The eviction policy may use eviction policies similar to common cache replacement strategies. For example, the system may use the well-known least-recently used (LRU), least-recently allocated (LRA), or least-frequently used (LFU) cache replacement policies to determine when a data chunk may be evicted from the linear storage layer 640. A later section of this document will describe additional details on data eviction.

Memory Efficient Deduplicated Layer

Referring back to FIG. 5, when the linear storage layer 540 determines that a particular data chunk is not being frequently accessed then the linear storage layer 540 spills that data chunk down to lower data storage layers for more efficient storage of the data chunk. In one embodiment, the linear storage layer 540 sends the data chunk to the deduplicated storage layer 550 for storage in the deduplicated storage area 557. The deduplicated storage layer 550 acts as a repository for "warm" data that is not as frequently accessed as the "hot" data in the linear storage layer 540 but still accessed regularly and typically read more often than written. As the name implies, the deduplicated storage layer 550 attempts to remove duplicated data from the stored data such that the deduplicated storage layer 550 stores data more efficiently than the linear storage layer 540.

In the deduplicated storage layer 550 (and all the lower data storage layers in this embodiment), the data is stored as data slices. Each data slice is uniquely identified with a data fingerprint (such as a SHA-256 fingerprint). The deduplicated storage layer 550 may use a deduplicated storage map 651 to keep track of where each data slice is stored within the deduplicated storage area 557 of the local data storage system. FIG. 6 illustrates a conceptual diagram of the deduplicated storage map 651 and the deduplicated storage area 657.

As illustrated in FIG. 6, the deduplicated storage map 651 may be implemented as a table that lists, for each data slice, the data fingerprint and the storage location of each data slice within the deduplicated storage area 657. In practice, the deduplicated storage map 651 may be implemented as a hash table (or similar data structure) to optimize search performance. If a requested data slice is not stored within the deduplicated storage area 657 then that data slice may be presumed to be stored in lower data storage layers.

When the linear storage area 647 is filled, the linear storage layer 640 must select one or more linear data chunks to spill down. In one embodiment, the linear storage layer 640 uses a "least recently allocated" (LRA) policy to determine when a particular data chunk should be spilled down to a lower data storage layer. The spilling down of data chunks may be performed by a background spill process that attempts to keep the linear storage area 647 approximately 85% full in one particular embodiment. This allows a large amount of data to be stored but keeps the linear storage layer 640 prepared to accept a new burst of data writes.

Figure 9:
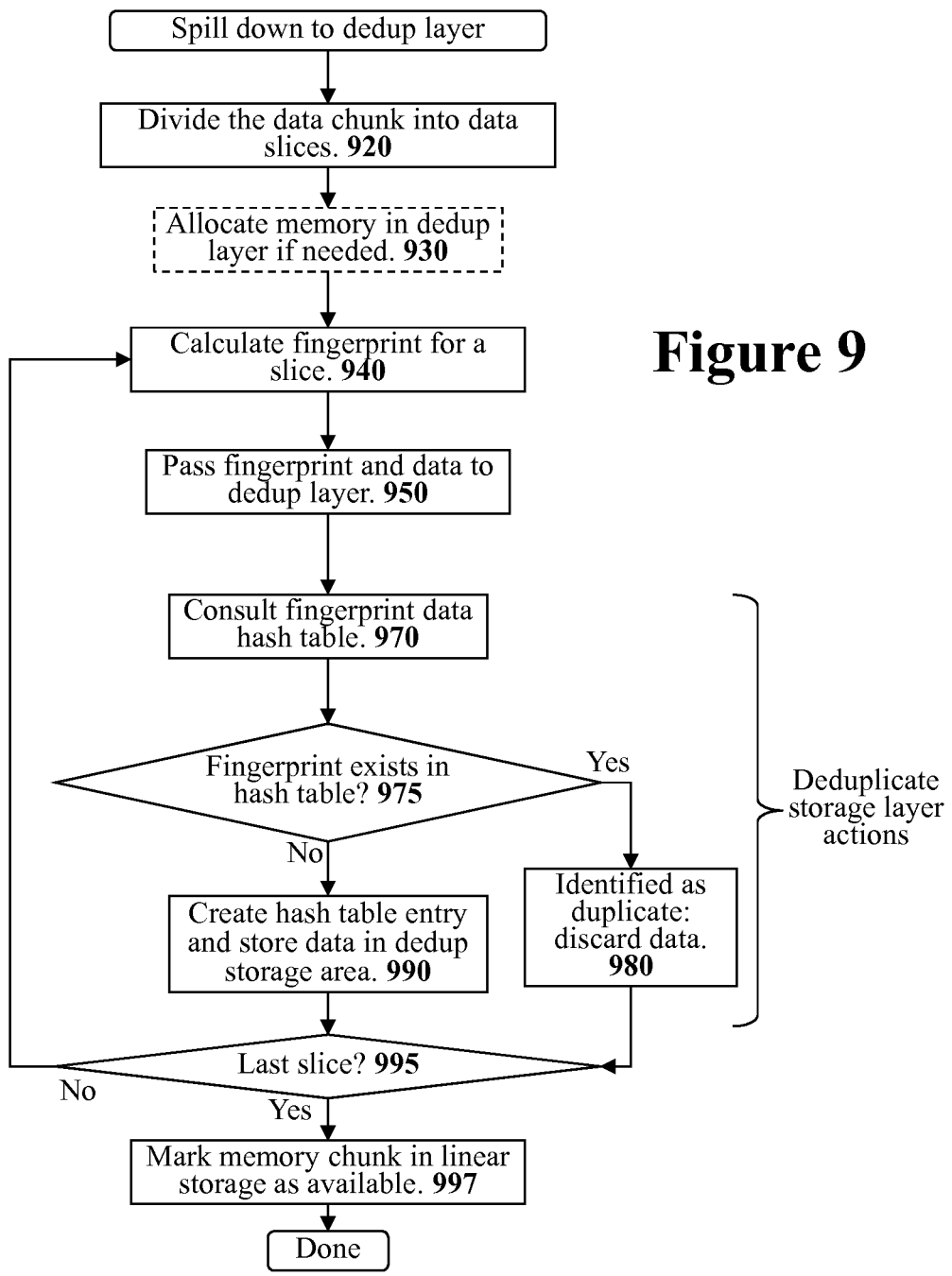
FIG. 9 illustrates a flow diagram that describes how a hierarchical mass storage system may divide a data chunk into data slices and remove duplicates.

FIG. 9 illustrates a flow diagram describing how a data slice may be spilled down from the linear storage layer 640 to the deduplicated storage layer 650. At stage 920, the linear storage layer 640 divides the data chunk into a set of individual data slices at stage 920. Many different techniques may be used to slice a data chunk (as used in the linear storage layer) into a set of data slices (as used in the lower data storage layers). The goal is to slice each data chunk up into individual data slices in a manner that will result in a high probability of identifying duplicate data slices. In one particular embodiment, each data chunk is sliced up using Rabin fingerprints. A Rabin fingerprint is a progressive polynomial that is calculated over a defined window. It is progressive since successive Rabin fingerprints may be calculated by dropping of a byte from one end of the defined window and adding another byte to the other end of the defined window. This allows a Rabin fingerprint to sweep through a chunk of data dividing it into data chunks.

FIG. 10 conceptually illustrates how a Rabin fingerprint calculator window 1050 may sweep through data chunk 1010 progressively calculating Rabin fingerprints. The Rabin fingerprint system may be used to sweep through the data chunk 1010 and periodically drop anchors to define data slices. An anchor may be dropped when the Rabin fingerprint equals some arbitrary value. In one particular embodiment, the system creates data slices that start at a first anchor defined by the beginning of the data chunk or the previous anchor, are at least 8K bytes long, and end when the specified arbitrary Rabin fingerprint value is generated or a 64K limit is reached (whichever occurs first). This implementation will create data slices that are all between 8K and 64K in length. If the arbitrary value is selected as a value with 16 zeroes in the least significant bits of the binary Rabin figure print, the data slices will average to be around 16K in size.

Referring back to FIG. 9, at stage 930 the system then may need to allocate space in the deduplicated storage area 657 if no space is available. This may be done by selecting a least recently allocated chunk of space in the deduplicated storage area 657 and spilling the data slices in that area down into a lower data layer. Note that, like the linear storage layer 640, the deduplicated storage layer 650 may also have a background process running that always attempts to keep the deduplicated storage area 657 approximately 85% filled such that the deduplicated storage layer 650 stores a large amount of data but can still always accept new data.

After dividing the data chunk into data slices and ensuring that space exists in the deduplicated storage layer 650, the linear storage layer 640 then begins to spill down individual data slices from the data chunk. At stage 940, the linear storage layer 640 first calculates a data fingerprint for a data slice. This fingerprint is a statistically unique identifier fingerprint such as a SHA-256 fingerprint. The linear storage layer 640 then provides the data slice and the fingerprint for the data slice to the deduplicated storage layer 650 at stage 950. (The data may be provided by simply passing a pointer to the data slice.)

Next, at stage 970, the deduplicated storage layer 650 examines the fingerprint identifier that it receives and searches the deduplicated storage map 651 to see if there is already an existing identical data slice already stored in the deduplicated storage area 657. With sufficiently strong fingerprint identifiers that have an extremely low probability of aliasing, simply comparing the fingerprint identifiers may be enough to identify duplicate data. In an alternative system, the deduplication may be performed in two stages. A first stage can use probabilistic methods to locate potential duplication candidates. After identifying candidates for deduplication, exhaustive algorithms verify the duplicated data and possibly adjust the data slice boundaries to obtain more duplicated data slices.

If the deduplicated storage layer 650 identifies redundant data, the deduplicated storage layer 650 may discard the data at stage 980. In embodiments wherein the system maintains a reference counter to keep track of how many different data chunks refer to a particular data slice, the system may increment that reference counter. When a received data slice is not yet represented in the deduplicated storage layer 650 (the same fingerprint was not found in the deduplicated storage map 651 at stage 975), then the deduplicated storage layer 650 adds that data slice to the deduplicated storage map 651 at stage 990. Specifically, the deduplicated storage layer 650 stores the actual data slice in the deduplicated storage area 657 and creates a new entry in the deduplicated storage map 651 (which may be a hash table) that includes the data fingerprint identifier and a pointer that points to the newly added data slice.

At stage 995, the linear storage layer 640 determines if this was the last data slice of the data chunk to spill down. If it is not, the linear storage layer 640 returns back to stage 940 to spill down another data slice. If this was the final data slice from the data chunk, then the linear storage layer 640 may now update the linear storage map 641 by removing the pointer to the data chunk in the linear storage area 647 and adding data fingerprint identifier entries for all of the data slices that make up the data chunk into the linear storage map 641. Thus, when a subsequent memory request is received that refers to that particular memory chunk, the system will need to access the data slices now stored in the deduplicated storage area 657 (or in lower data storage layers) by using the fingerprint identifiers.

By removing duplicated data at stages 975 and 980, the deduplicated storage layer 650 greatly increases the storage efficiency. This allows many more logical volumes of data to be stored in the local storage layers beneath the linear storage layer 540 that only stores data in a raw unprocessed form. However, this increased data storage efficiency comes at a cost. The linear storage layer 540 must slice up each data chunk and calculate fingerprint identifiers for each data slice. The deduplicated storage layer 550 must handle the identification and elimination of duplicated data slices. Furthermore, spilling data into the deduplicated storage layer 550 involves significant metadata updates to maintain the deduplicated data storage map 651. However, since processing power is now very inexpensive and the bandwidth of the local storage layer is far greater than the bandwidth to the cloud data storage, this is a worthy trade-off.

Another cost for the improved memory efficiency is that when a read request is received for a data chunk in the deduplicated storage layer 650 then that read request must be satisfied with disassembled data from the deduplicated storage area 657. Thus, the linear storage layer 640 must fetch each needed data slice from the deduplicated storage layer 650 (or lower data storage layers) and then reassemble the data slices to obtain the requested data chunk. This means that the latency time for read requests that are serviced by the deduplicated storage layer 650 will be higher than the latency time for read requests that are serviced by the linear storage layer 640. However, this latency difference is relatively small and worth the trade-off since data deduplication allows much more data to be stored within the high-speed deduplicated storage area 657. Storing more data in the high-speed deduplicated storage area 657 will mean fewer accesses to the lower (slower) data storage layers that store data on hard disk or with the off-site cloud data storage provider which will have a much greater latency time.

Referring back to FIG. 5, the deduplicated storage layer 550 acts as a relatively fast local tier of data storage. The "warm" data in the deduplicated storage layer 550 is not accessed as frequently as the data in the linear storage layer 540 but data in the deduplicated storage layer 550 is still accessed on a fairly regular basis. Although, the deduplicated storage layer 550 stores data more efficiently, the deduplicated storage layer 550 will eventually run out of storage space. When the deduplicated storage layer 550 runs out of storage space, the deduplicated storage layer 550 must begin to evict existing data slices to make room for new data slices. The deduplicated storage layer 550 will spill the evicted data slices further down the storage request handling stack 515.

Note that data eviction policies used by the deduplicated storage layer 550 may be the same, similar, or different than the data eviction policies used by the linear storage layer 540. Referring to FIG. 6, some implementations of the deduplicated storage layer 650 may maintain a 'reference counter' value in the deduplicated data storage map 651 that maintains a count of the number of times each data slice is referenced by a data chunk. In embodiments that implement such a reference counter, the reference counter may be used by the data eviction algorithm such that data slices that are referenced many times are less likely to be evicted from the deduplicated storage layer 650.

In addition to spilling data down in order to make more storage space available the deduplicated storage area 557, the deduplicated storage layer 550 may proactively spill data slices down to the lower data storage layers before it is necessary to do so. In particular, it can be very advantageous to proactively spill data out to the cloud storage provider 591 before being requested to do so. This allows the bandwidth of the communication link to the cloud data storage provider 591 to be used more efficiently since data slices can be sent when there is idle bandwidth. However, the data slices may also remain locally within the hierarchical mass storage system 500 such that read requests for those data slices may be serviced quickly.

Transient Storage Layer

Referring to FIG. 5, read requests for data slices that cannot be fully serviced by the previous two data storage layers are passed the transient storage layer 560. The transient storage layer 560 may be used to store "lukewarm" data that is accessed relatively infrequently. The transient storage layer 560 may store data onto hard disk drives that can offer very large amounts of data storage for a low cost. However, storing data on a hard disk drive instead of within solid state memory (SSM) means that there will be a slightly longer latency time when responding to read requests.

When deduplicated storage layer 550 is filled, it will spill data slices down to the transient storage layer 560. Referring to the embodiment of FIG. 6, the transient storage layer 660 may maintain its own transient storage map 661 that identifies the locations of data slices stored within the transient storage area 667.

Referring back to the embodiment of FIG. 5, all data slices spilled down to the transient layer 560 pass through a compression layer 559 that compresses the data slices to store the data more compactly within the transient storage layer 560. The compression layer 559 may allow multiple different compression systems to be used. To enable this, the compression layer 559 may prepend compression information 1115 onto the compressed data slice 1110 as illustrated in FIG. 11A. The compression information 1115 may include a code to that specifies the particular compression algorithm and version used to compress the compressed data slice 1110. This allows the compression layer 559 to select the proper decompression system when multiple different compression systems are being used. Such an extensible system may be able to select the optimum compression system for a particular data slice. Furthermore, this allows new compression algorithms to be added to the system over time.

The compression of the data slices accomplishes two goals. First, the compression reduces the amount of data that needs to be stored in the transient storage 567 such that the amount of data that can be stored locally within the hierarchical mass storage system 500 is increased. And second, the compression reduces the bandwidth usage on the internet connection 596 if the data slices are eventually sent to the data storage provider 591. Reducing the bandwidth usage is very important since this reduces the large disparity between the high-speed bandwidth at the front-end storage area network connection 502 and this back-end internet connection 596 to the cloud data storage provider 591.

Cloud Storage Layer

Referring to FIG. 5, beneath the transient storage layer 560 is a cloud storage layer 580 that may be used to store data at an off-site cloud storage provider 591. Data stored off-site will generally introduce some latency when that data is read back. The cloud storage layer 580 may be used in various different manners depending on how the hierarchical mass storage system 500 is configured. For example, a hierarchical mass storage system 500 may be instructed to use the cloud storage layer 580 for back-up operations only, for normal data storage only when absolutely necessary, or as just another layer of the hierarchical data mass storage system 500.

In a "back-up only" configuration, the hierarchical mass storage system 500 is designed to only use the local storage layers (linear, deduplicated, and transient) as primary data storage. In such a configuration, the cloud storage layer 580 is only activated when an administrator specifically requests that an off-site back-up volume be created. If the hierarchical mass storage system 500 device runs low on storage space in the local storage layers then an administrator of the system will be warned such that the administrator can add more local storage capacity, delete data to create more local space, or change the configuration to begin using the cloud storage layer 580 for normal data storage. Using the "back-up only" configuration ensures that all of the data will always be available locally such that if the data link 596 to the cloud storage provider 591 were to malfunction, all of the data volumes would still be available locally. Furthermore, using the "back-up only" configuration will ensure that there is never a long latency time for data requests because all of the data will be available locally within the hierarchical mass storage system 500.

In an "only when necessary" configuration, the hierarchical mass storage system 500 will always attempt to keep all of the data locally. However, if there is insufficient storage space left in the local storage layers (linear, deduplicated, and transient) then the hierarchical mass storage system 500 will begin to store data at the off-site cloud storage provider 591. The administrator will be notified that off-site data is occurring such that the administrator can take various actions in response. As set forth above, the administrator may add more local storage capacity, delete data to create more local storage space, or begin using the cloud storage layer 580 for normal data storage.

Finally, in a normal "cloud storage" configuration, the hierarchical mass storage system 500 uses the cloud storage layer 580 as just another successive data storage tier. In one such embodiment, there are three different layers of local storage (linear, deduplicated, and transient) and a fourth infinitely-extensible cloud storage layer. When in normal cloud storage mode, the hierarchical mass storage system 500 would never run out of storage space due to the use of extensible cloud storage. In normal cloud storage mode, the cloud storage layer 580 stores "cold" data, data that is rarely accessed, at the cloud storage data provider 591. Since it takes time to retrieve data from the off-site data storage provider 591, there will generally be a larger latency period for any data storage request that requires access to the off-site cloud data storage provider 591. Ideally such latency should only rarely occur when accessing old data archives since the vast majority of the frequently used data should be represented in the local storage layers of the hierarchical mass storage system 500.

When a higher data storage layer spills a data slice down toward the cloud storage layer 580, a barrier layer 570 first stores a copy of the data slice in a barrier storage area 547. The barrier storage area 547 is used to temporarily store a copy of data that the cloud storage layer 580 will transmit to the data storage provider 591. FIG. 5 illustrates the barrier storage area 547 in SSM, but the barrier storage may be in SSM or on a hard disk drive. The barrier layer 570 stores data slices in the barrier storage 577 for a 'settlement period' that allows the data storage provider 591 to fully complete its own data storage tasks. If data sent to the data storage provider 591 were requested too soon, the data storage provider 591 may fail at providing the data since the data storage provider 591 may not be ready to respond to data queries yet. Thus, when the transient storage layer 560 spills down a read request for, the barrier layer 570 first checks the barrier storage area 547 to see if the requested data is available there. If the requested data is located in the barrier storage area 547 then the barrier layer 570 will respond to the data request using that data slice located in the barrier storage area 547. If the requested data slice is not located in the barrier storage area 547 then the barrier layer 570 will pass the read request down to the cloud storage layer 580 so the cloud storage layer 580 can request the data slice from the cloud data storage provider 591.

In addition to allowing transmitted data slices to settle at the data storage provider 591, the barrier layer 570 serves additional purposes. One important purpose is to handle storage request serialization. Many cloud data storage providers will perform data storage requests received in close time proximity out of the original order that the data storage requests were received in. Thus, if a purge request is transmitted and then followed a write request to the same data location, the cloud data storage provider 591 might reverse the order of these requests such that the system writes the data and then purges the data thereby destroying data! To prevent this potential disastrous occurrence, the barrier layer 570 will place a long waiting period between data storage requests that refer to the same data slice.

Before the cloud storage layer 580 transmits data to the data storage provider 591, the cloud storage layer 580 first prepares the data slices to be sent. Specifically, the data slices may first be encrypted by encryption layer 583. By encrypting the data, the user of the hierarchical mass storage system 500 does not need to fear for their data security. The encryption prevents any person tapping the internet connection 596 or examining the data stored at the storage provider 591 from being able to understand the real meaning of the data.

Many different data encryption systems may be used within the encryption layer 583. In one particular embodiment, the AES-256 encryption system was implemented within the encryption layer 583. As with the compression stage, the encryption layer 583 may allow multiple different encryption systems to be used by prepending encryption information 1125 to the encrypted data slice 1120 as illustrated in FIG. 11B. The encryption information 1125 allows the encryption layer 583 to select the proper decryption system and version when multiple different data encryption systems may be used. The prepended encryption information 1125 may also specify the size of the enclosed data slice since some encryption systems only operate on fixed size data and thus require padding bytes. Note that the use of pre-pending compression 1115 and encryption information 1125 allows new compression and encryption systems to be added to the hierarchical mass storage system 500 at any time.

The use of prepended encryption information 1125 may also be used to help with encryption key management. Encryption keys may be changed on a regular basis to improve the data security. A code may be placed into the prepended encryption information 1125 to help select the proper key for data decryption. In one embodiment, the system allows an administrator to use a passphrase to generate an encryption key. Multiple levels of authority may be used to protect keys from be lost. In addition, a built-in system may allow a customer to contact the manufacturer of the hierarchical mass storage system 500 system if the passphrase for an encryption key has been lost.

After storing a copy in the barrier storage 577 and being encrypted by the encryption layer 583, the compressed and encrypted data slice is provided to the cloud storage layer 580 that is responsible for transmitting data slice to the data storage provider 591. The cloud storage layer 580 first creates a new data object within the cloud data storage provider 591 to store the data slice. In one embodiment, the cloud storage layer 580 uses the same the fingerprint identifier from the previous storage layers as the name for the data object. The cloud storage layer 580 then writes (transmits) the data to the newly created data object. The cloud storage layer 580 then allows for the settlement period wherein it waits a specified amount of time before the data can be read back from the data storage provider 591. This settlement period is a time value that may be configured based upon the particular data storage provider 591 that is being used. Once the settlement period expires, the cloud storage layer 580 informs the barrier layer 570 that the barrier layer 570 may delete the copy of the data slice that was placed in the barrier storage 577. Thus, subsequent read operations for that data slice must be serviced by requesting the data slice back from the cloud data storage provider 591.

To ensure that the data was properly stored with the data storage provider 591, the cloud storage layer 580 may calculate a checksum value of data using the same type of checksum used by the data storage provider 591. After receiving data for storage, the data storage provider 591 may transmit a checksum value back in an acknowledgement message. If the two checksum values do not match, the cloud storage layer 580 may retransmit the data slice. When such checksums are used, the copy of the data in the barrier storage 577 should not be removed until matching checksums have been achieved and the settlement period has expired.

Unlike the higher storage layers, the cloud storage layer 580 does not need to maintain a map of the data slices. The data storage provider 591 is responsible for maintaining a system that links data slice fingerprint identifiers to the data slice objects such that the cloud storage layer 580 can request and obtain data slices back from the data storage provider 591.

Data read requests passed down by the transient storage layer 560 are handled in basically the same manner as write requests but in reverse order. As set forth above, the barrier layer 570 will first attempt to serve a data request using data stored in the barrier storage 577. If the data request cannot be served from data in the barrier storage 577, the cloud storage layer 580 will send a read request to the cloud data storage provider 591 using the data slice fingerprint identifier as the name of the requested data object. After receiving a response from the cloud data storage provider 591, the cloud storage layer 580 can perform data integrity check on the received data slice by calculating a checksum the received data. If the calculated checksum does not match the checksum received from the deduplicated storage layer 550 then the cloud data storage provider 591 may have corrupted the data. Retries may be attempted to obtain the proper data from the cloud data storage provider 591. If the proper data cannot be retrieved, a 'media error' message may be propagated back up the data storage stack 515.

When verified data has been received, that verified data is then provided to the encryption layer 583 for decryption. The decrypted data is then passed to the transient storage layer 560 where the data slice may be stored in transient storage 567. However, to handle the data read request, the data slice is decompressed by the compression layer 559 and the requested data slice is passed further up the request handling stack 515. The deduplicated storage layer 550 will receive the data slice that was fetched from the cloud and may place that data back into its duplicated storage area 557. The deduplicated storage layer 550 passes the requested data up to the linear storage layer 540 and finally the linear storage layer completes the read request by assembling the requested data as set forth in stage 760 of FIG. 7.

Note that as a data slice is passed back up the data request handling stack 515, the data slice may be stored within several different storage layers of the data request handling stack 515 and will continue to remain at the cloud data storage provider 591. If the deduplicated storage layer 550 again evicts a data slice that was also stored in the transient storage layer 560 (and that data slice has not changed) then that data slice does not need to be stored in the transient storage layer 560 again since it already exists there. Thus, the deduplicated storage layer 550 may just delete its copy of the data slice.

The data request handling stack 515 and its various data storage layers may be implemented in various different manners depending on the needs of a specific application. Note that the various different techniques may be used independently or in a combined hierarchical mass storage system 500.

Scaling the Hierarchical Data Storage System

The hierarchical mass storage system 500 of FIG. 5 may be implemented as mass storage appliance 460 for an office environment as illustrated FIG. 4 wherein the mass storage appliance 460 provides data storage services to several server systems (441, 442, and 443). The server systems (441, 442, and 443) provide various services to a collection of user workstations (421 to 427). However, the office environment depicted within FIG. 4 will generally require a local information technology department to configure and maintain the local area network 430, the various server systems (441, 442, and 443), the storage area network 450, the hierarchical mass storage system 460, and the account with the cloud storage provider 491.

Figure 12:
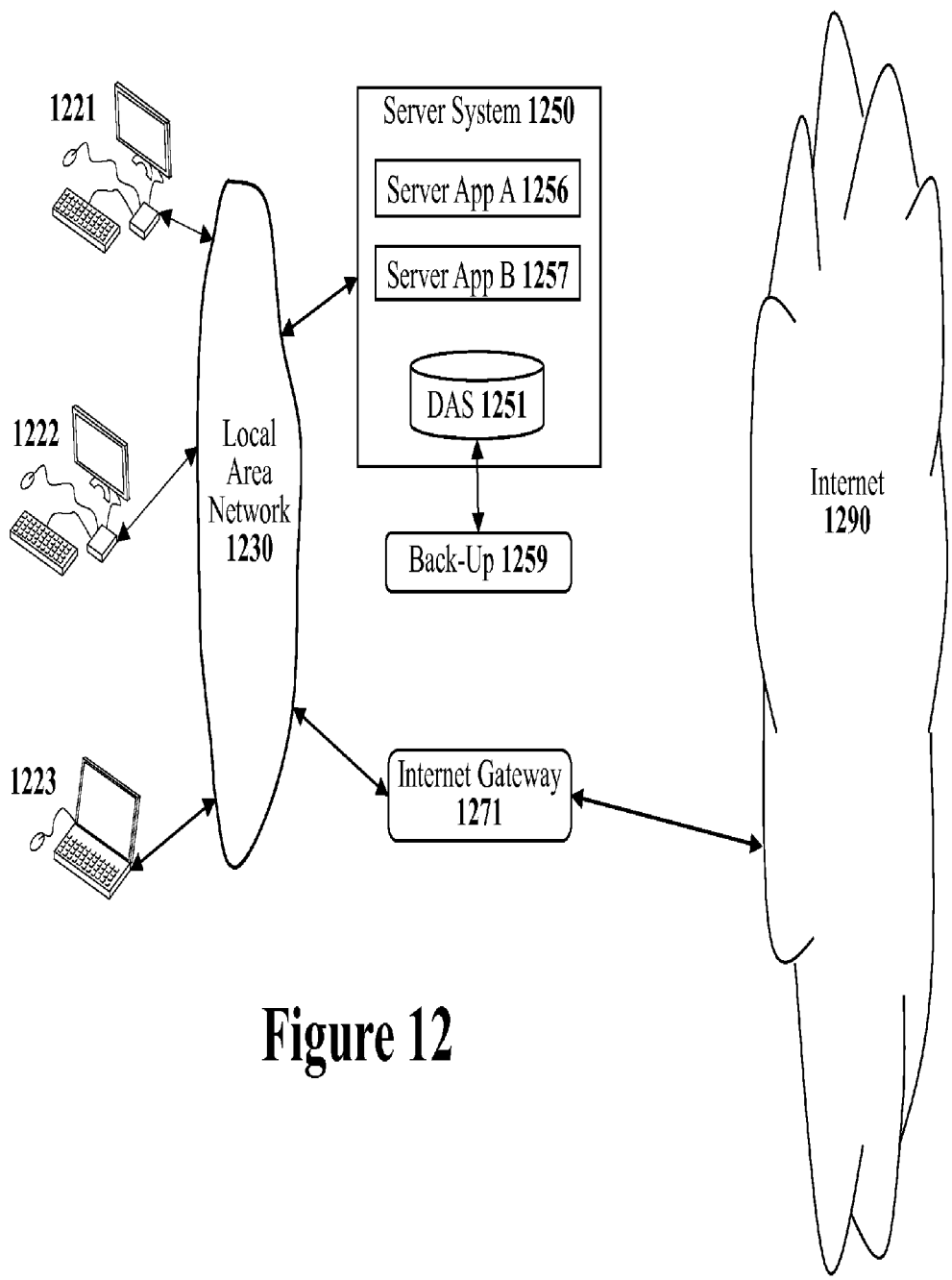
FIG. 12 illustrates the computer infrastructure for a small office environment with just three local employees that use workstations.

For a small office or a remote branch office, it is generally not feasible to employ a dedicated information technology employee. For example, FIG. 12 illustrates the computer infrastructure for a small office environment with just three local employees that use workstations 1221, 1222, and 1223. Besides the three workstations (1221, 1222, and 1223), the small office of FIG. 12 consists of a local area network 1230, a small local server 1250, and an internet gateway device 1271 that provide internet service. The small local server 1250 runs a few server applications such as server application A 1256 and server application B 1257 that provide some local services to the office such as file sharing, print sharing, email, etc.

Although the computer infrastructure of FIG. 12 is much simpler than the more sophisticated infrastructure of FIG. 4, some information technology maintenance will still be required. For example, the direct attached storage (DAS) 1251 of server system 1250 needs to be maintained and periodic back-ups of the server's direct attached storage (DAS) 1251 must be performed using back-up system 1259. Thus, in order to maintain even the very limited infrastructure of FIG. 12, an information technology (IT) person from a larger office must periodically visit this office, an outside IT person must be hired on a contract basis, or one of the employees of the office must spend part of their time working on IT issues for the small office.

Figure 13:
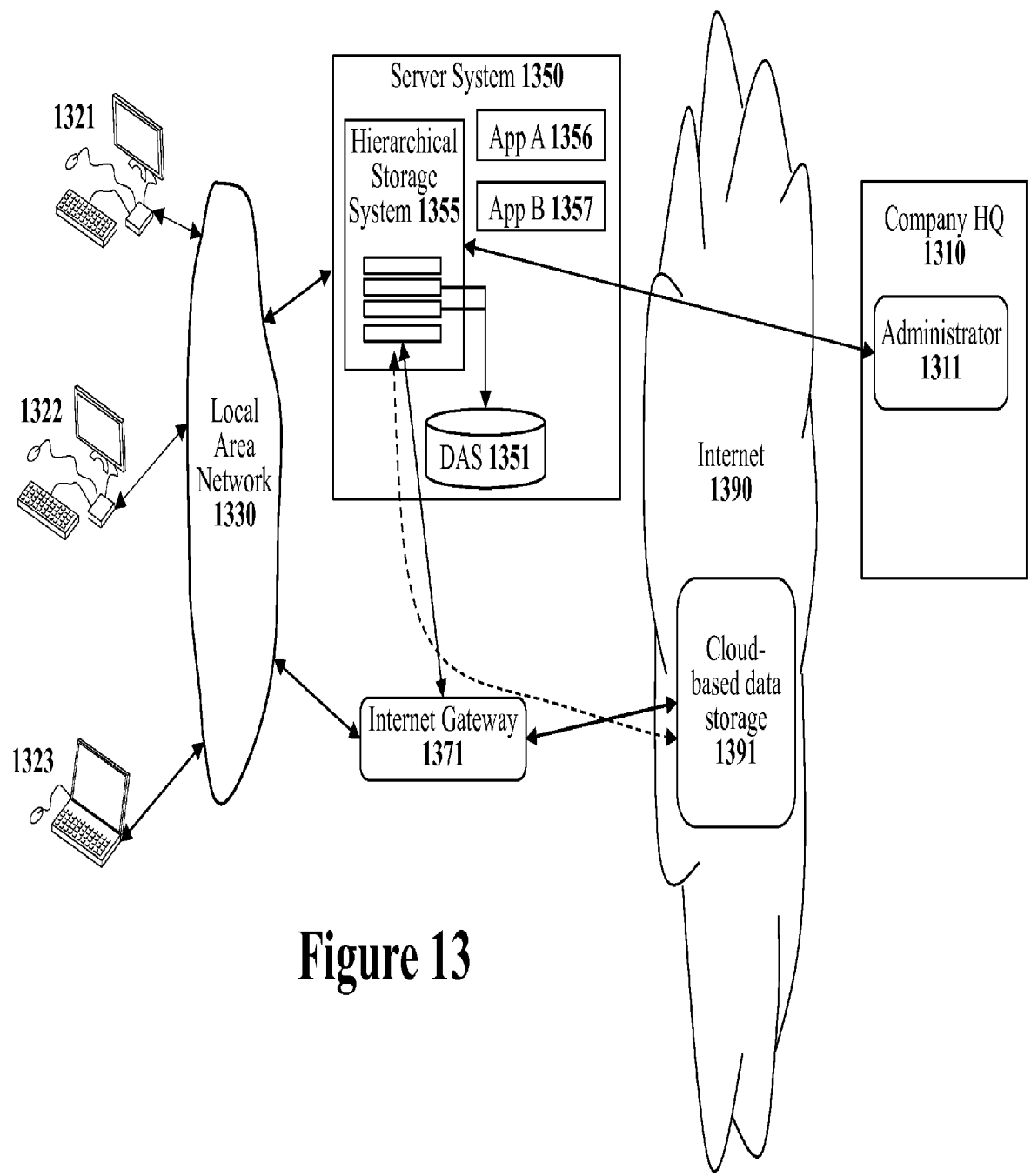
FIG. 13 illustrates a small office computer environment similar to FIG. 12 wherein the small server system includes an integrated hierarchical storage system.

Instead of requiring an information technology person to visit the small office of FIG. 12, it would be desirable if all the data storage services for the office could be handled remotely. To provide such a solution, the present disclosure proposes integrating a remotely controllable hierarchical storage system into the server system 1250. Specifically, FIG. 13 illustrates a small office computer environment very similar to FIG. 12 wherein the small server system 1350 includes an integrated hierarchical storage system 1355. The integrated hierarchical storage system 1355 provides data storage services to the applications that run on the server system 1350 (Application A 1356 and Application B 1357).

The small office environment of FIG. 13 with a server system 1350 that includes an integrated hierarchical storage system 1355 provides several advantages over the traditional small office environment of FIG. 12. For example, the integrated hierarchical storage system 1355 uses a cloud-based data storage service 1391 to provide ever-expanding storage capacity to the server system 1350. Furthermore, the integrated hierarchical storage system 1355 uses data deduplication and compression techniques to use the local storage capacity within the direct attached storage 1351 very efficiently. But one of the most important aspects of the integrated hierarchical storage system 1355 is the remote administration capabilities.

As set forth with reference to FIG. 5, a hierarchical storage system 500 includes an administration component 510. The administration component 510 allows the hierarchical storage system 500 to be configured and maintained remotely through a network interface. Referring back to FIG. 13, this means that an administrator 1311 at the IT department of a company headquarters 1310 (or at contract agency) can remotely access, configure, and maintain all of the data storage functions of the server system 1350. Data storage related maintenance tasks generally require a person to be physically present since the administrator must often deal with the physical storage hardware. For example, an administrator may need to physically replace existing hard disk drives with larger hard disk drives when an office has outgrown the current data storage capacity. However, since the hierarchical storage system 1355 virtualizes disk volumes and uses ever-expandable cloud-based storage, the hierarchical storage system 1355 allows most data storage maintenance tasks to be handled remotely.

For example, with a traditional small office server 1250 as illustrated in FIG. 12, a local administrator must usually be present to handle the physical back-up media when backing-up the directed attached storage 1251 with back-up system 1259. But in the server system 1350 of FIG. 13 with an integrated hierarchical storage system 1355, a remote administrator 1311 may instruct the hierarchical storage system 1355 to create back-ups of data volumes in the cloud-based data storage 1391. Similarly, when a new data volume is needed to store more data, the remote administrator 1311 may instruct the hierarchical storage system 1355 to create a new data volume. The creation of a new data volume will not require the physical addition of a new disk since the hierarchical storage system 1355 will instead evict old inactive data from the local directed attached storage 1251 as needed to create room for the new data volume. Thus, as long as the local storage systems are able to handle the data that is actively used on server system 1350, no new local storage will be required. Instead, the cloud-based data storage 1391 acts as an ever-expanding storage system.

Integrated Hierarchical Data Storage System Details

Figure 14:
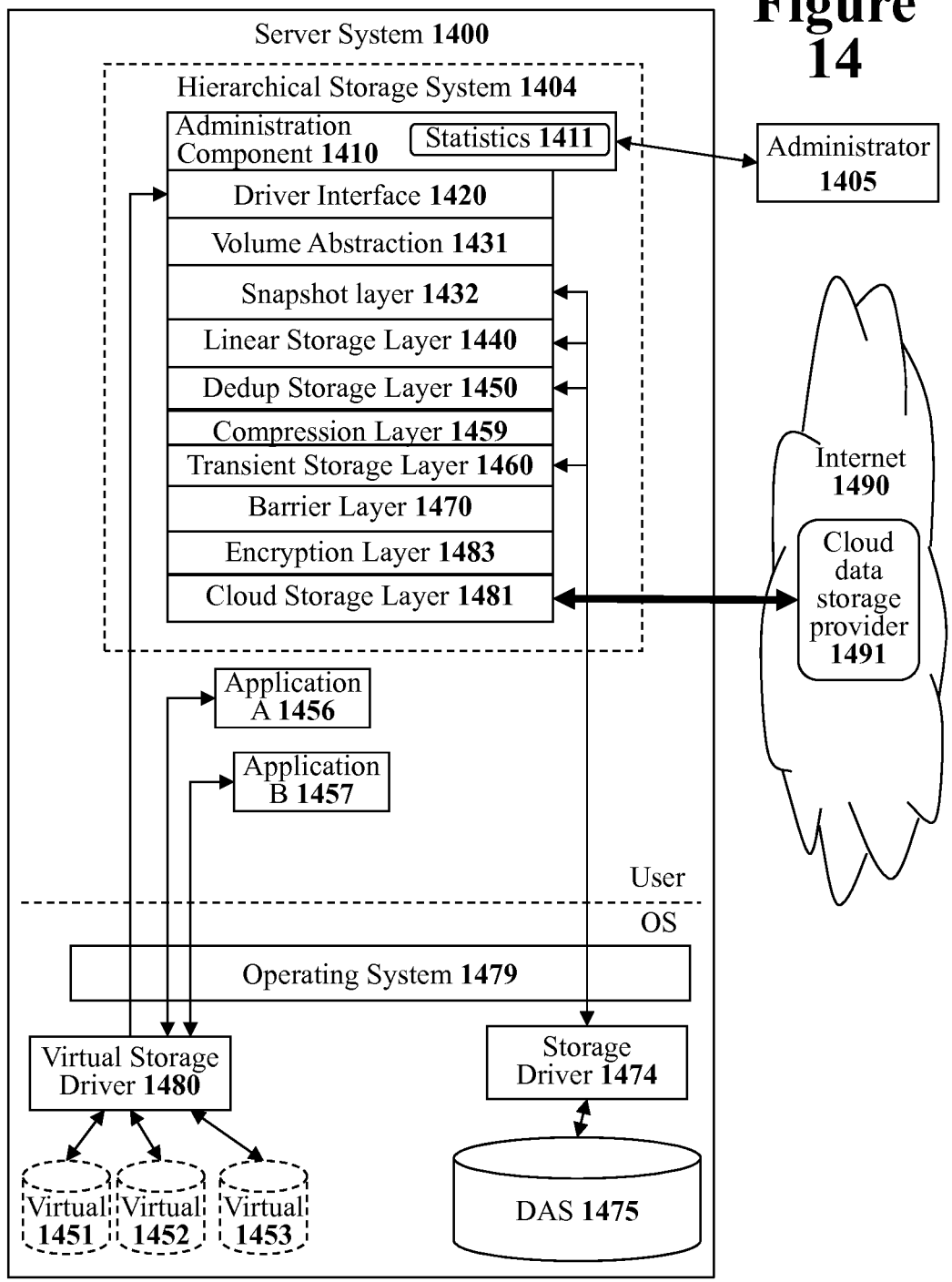
FIG. 14 illustrates a detailed block diagram of one embodiment of server system with an integrated hierarchical storage system.

The integrated hierarchical storage system 1355 may be implemented in a variety of different ways. FIG. 14 illustrates a detailed block diagram of one embodiment of server system 1400 with an integrated hierarchical storage system 1404. The hierarchical storage system 1404 may be implemented within Microsoft Windows, Linux, and other operating systems.

In the server system 1400, the software environment is divided into user space and operating system (or kernel) space. The operating system, various libraries, and device drivers execute in the operating system space. Programs running in the operating system space are granted more privileges and are able to access hardware features directly. For security reasons, application programs execute in a user space that is granted fewer privileges and is not allowed to access hardware features directly. For example, application A 1456 and application B 1457 execute in the user space. This arrangement allows computer systems to operate in a more robust manner since application programs, whether intentionally malicious or merely poorly written, are prevented from performing operations that would cause the server system to crash.

To access storage resources (which requires access to some data storage hardware), application programs must issue requests to the operating system 1479. For example, application A 1456 and application B 1457 may issue storage requests through operating system 1479 that are provided to a virtual storage driver 1480 that handles data storage requests. In a typical computer system, a normal storage driver would fulfill the storage requests by storing data onto a data storage device such as direct attached storage 1475. However, in the embodiment of FIG. 14, the virtual storage driver 1480 instead appears to make virtual disk volumes 1451, 1452, and 1453 available but handles the storage requests for these virtual disk volumes by passing the requests to the hierarchical storage system 1404. In Windows Server environment, the virtual storage driver 1480 may be implemented as a Storport driver. In a Linux environment, the virtual storage driver 1480 may be implemented as a virtual SCSI device driver.

Note that by implementing the system at the virtual storage device driver, the disclosed system handles all types of storage requests. Specifically, referring back to FIG. 2, an application program may make a storage request through the file system 211 of an operating system or may make a direct storage request to a storage control system to store a raw block of data. By implementing a virtual storage driver 1480 within the operating system space, the disclosed system can handle advanced storage requests from applications such as databases that use raw block storage requests instead of simple file requests through the file system.

In the particular embodiment disclosed in FIG. 14, the data storage handling stack of the hierarchical storage system 1404 is implemented within user space. This may be done since there are more programming support tools for developing in user space and user space applications do not require approval from the entity that creates the operating system. However, in other embodiments, the data storage handling stack may be implemented in the operating system space. The virtual storage driver 1480 passes all storage requests to a driver interface 1420 at the top of the data storage handling stack. The data storage request is then processed by the various different layers of the data storage handling stack until the request is fully resolved. To handle local data storage, the various data storage layers (linear storage 1440, deduplicated storage 1450, transient storage 1460, etc.) access a real storage driver 1474 that handles storage requests for a real direct attached storage device 1475 in the server system.

Various different embodiments may use various different types of data storage for different levels. For example, to implement a high-performance system, the linear storage layer 1440 may use solid-state storage to reduce latency and have high throughput. However, in a small office environment as illustrated in FIG. 13, low latency performance may not be of paramount performance such that all of the local data storage levels may simply use a local hard disk drive system. Although such a disk-based integrated hierarchical storage system embodiment will not provide very low latency or high throughput, the integrated hierarchical storage system 1404 will still benefit from the increased storage efficiency provided by performing data duplication in the deduplication storage layer 1450 and data compression in the transient storage layer 1460. More importantly, the server-based hierarchical storage system 1404 will benefit from a wealth of storage management features such as remote volume creation, cloud-based back-ups, ever-expanding storage size without hardware upgrades, remote volume duplication, centralized storage management across multiple sites, etc. The importance of these features will be described in greater detail in the next section.

The cloud storage layer 1481 of the data storage handling stack interacts with a cloud data storage provider 1491 to enable the server system 1400 to handle far more data than can be stored just in the direct attached storage device 1475. Specifically, the cloud storage layer's ability to store data at the cloud data storage provider 1491 allows the hierarchical storage system 1404 to provide ever-expanding data store on the server system 1400.

Integrated Hierarchical Data Storage Server Features

Having a server system with an integrated hierarchical storage system greatly simplifies the creation and support of satellite small offices. To illustrate the ease in which satellite offices can be supported, a set of examples will be presented with reference to FIGS. 15A to 15H.

Figure 15A:
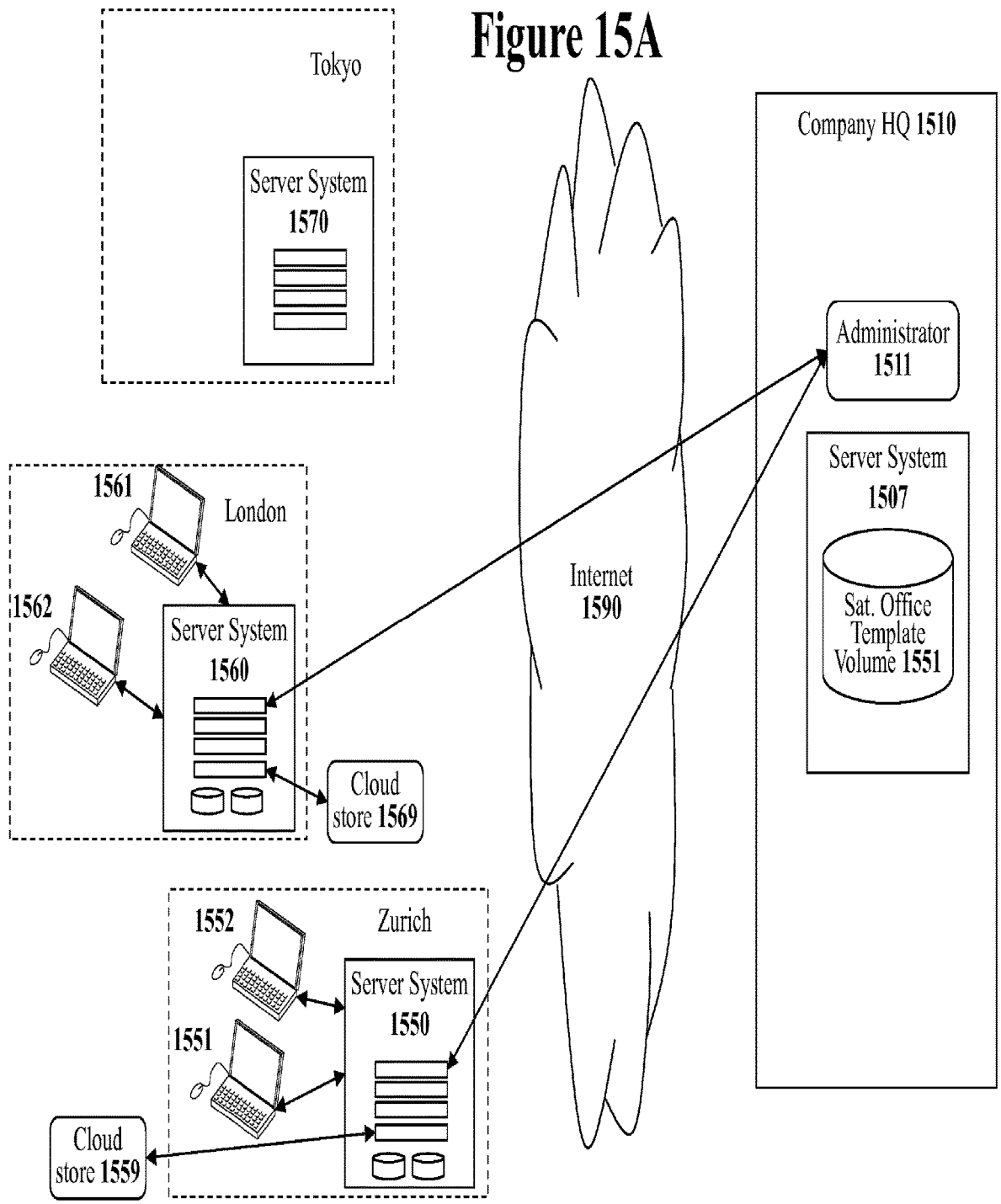
FIG. 15A illustrates a block diagram of a company with a headquarters and two satellite offices in London and Zurich that desires to open an office in Tokyo.

FIG. 15A illustrate a block diagram of a company with a headquarters 1510 and two satellite offices in London and Zurich. An administrator 1511 at headquarters 1510 maintains two server systems 1560 and 1550 at the satellite offices in London and Zurich, respectively that have an integrated hierarchical data storage system. Each of the satellite office server system (1560 and 1550) uses a regional cloud storage provider to provide high-speed cloud storage service (1569 and 1559, respectively). Note that many countries have data privacy rules that describe how data must be handled such that storing data with regional cloud storage provider will help fulfill such legal obligations.

The company decides to open a new satellite office in Tokyo. To set up a satellite office in Tokyo, a new server system 1570 with an integrated hierarchical storage system is built and sent to the Tokyo office. Once the server system 1570 arrives at the new Tokyo office it is coupled to an internet connection and booted up.

Figure 15B:
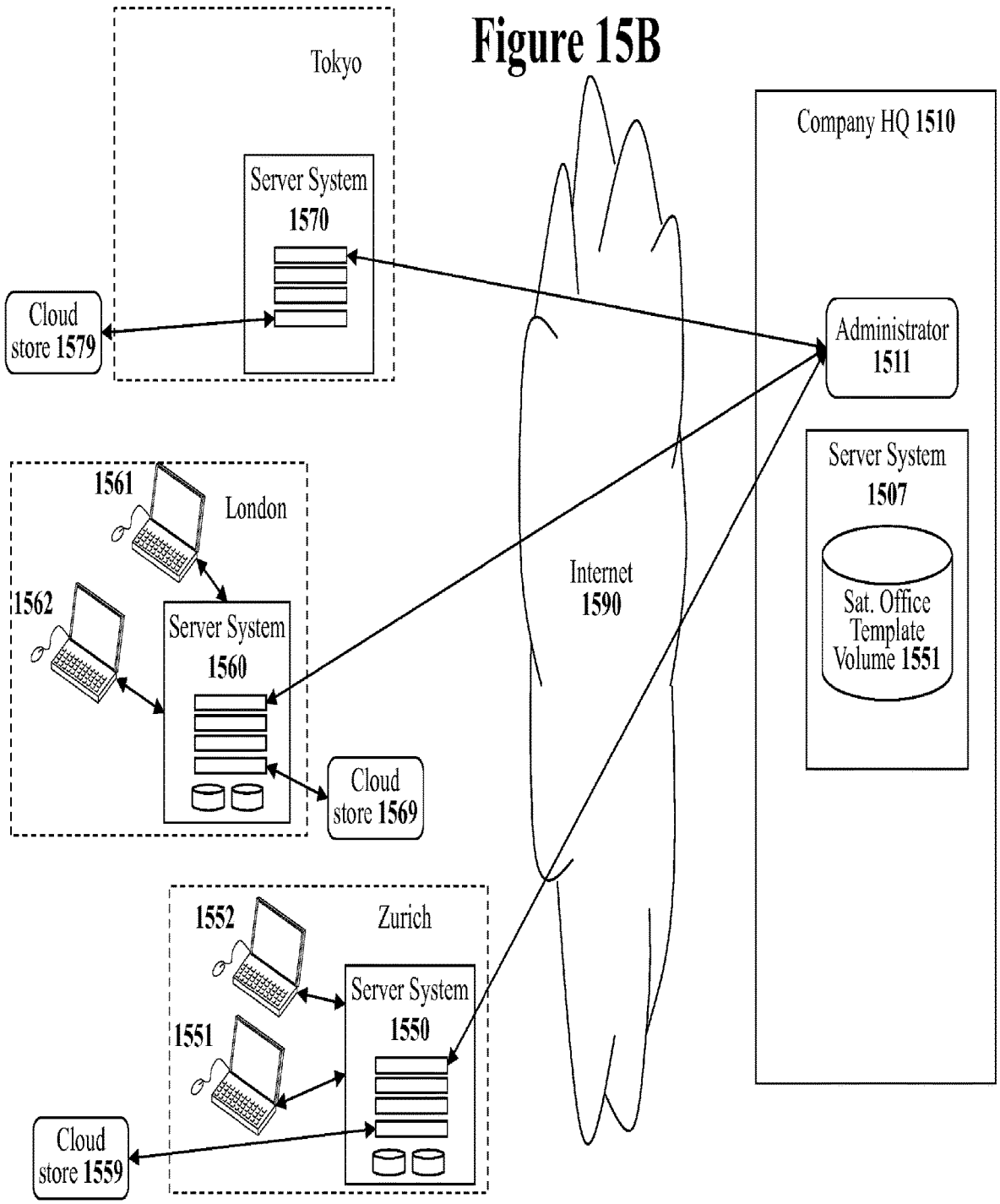
FIG. 15B illustrates the block diagram of FIG. 15A after configuring a server in Tokyo for regional cloud-storage.

After booting up the server system 1570, the administrator 1511 can log into the server system 1570 and configure the server system 1570 for operation as illustrated in FIG. 15B. One of the first tasks the administrator 1511 does is to open an account with a local cloud storage provider 1579 and configure the server system 1570 to use local cloud storage provider 1579 as bottom tier of the hierarchical data storage system. At this point the Tokyo server system 1570 is ready to handle an ever-expanding amount of data storage.

Figure 15C:
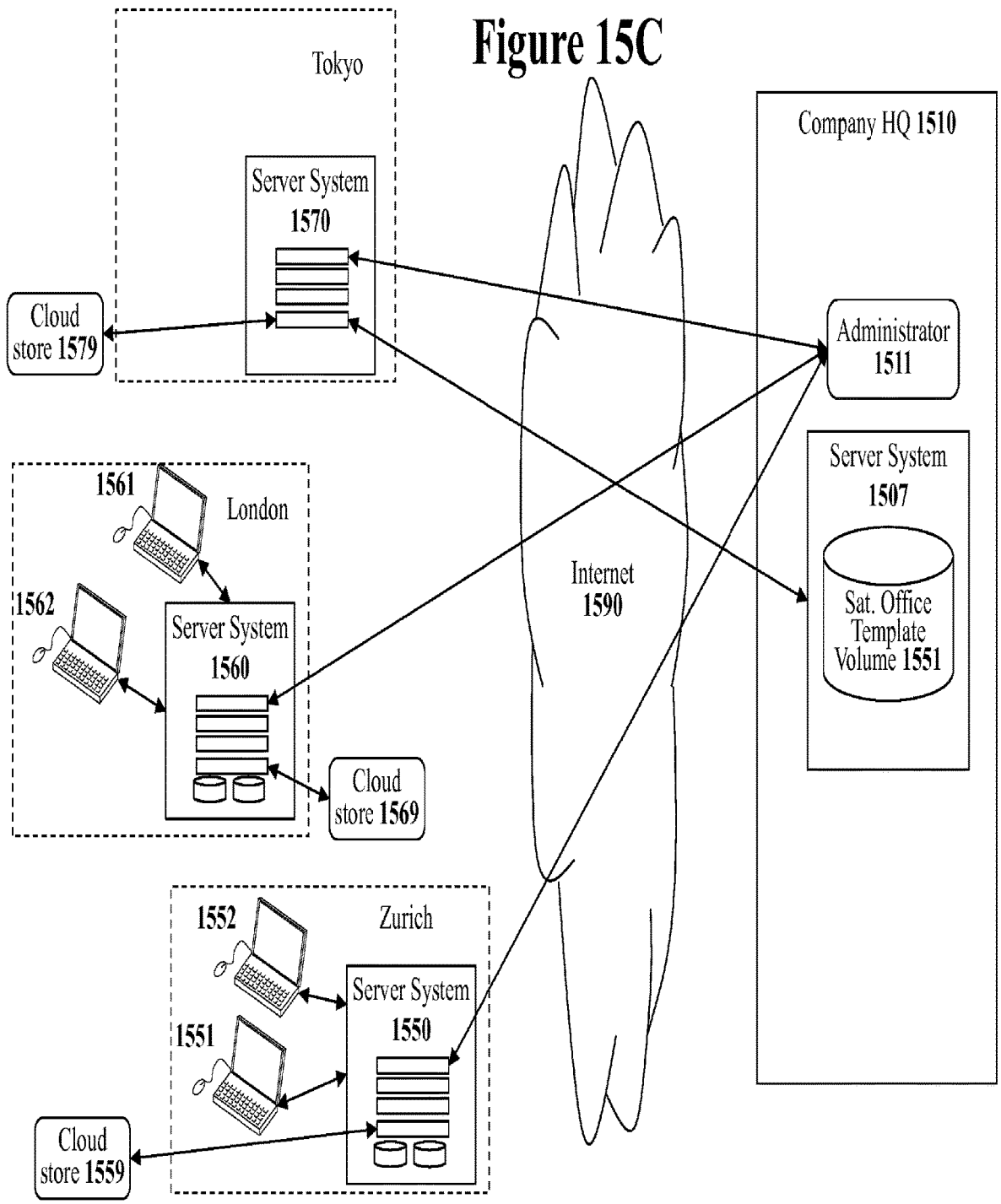
FIG. 15C illustrates the block diagram of FIG. 15B after configuring the server in Tokyo to access a server at the headquarters.

Next, the administrator 1511 may wish to create some virtual data volumes and populate the Tokyo server system 1570 with applications and data for use by the Tokyo office. To do this, the administrator 1511 may configure the cloud storage layer in the Tokyo server system 1570 to use a server system 1507 at the headquarters 1510 as a source of data as illustrated in FIG. 15C. Then, the administrator 1511 may 'restore' a satellite office template volume 1551 at the headquarters 1510 within the Tokyo server system 1570.

Figure 15D:
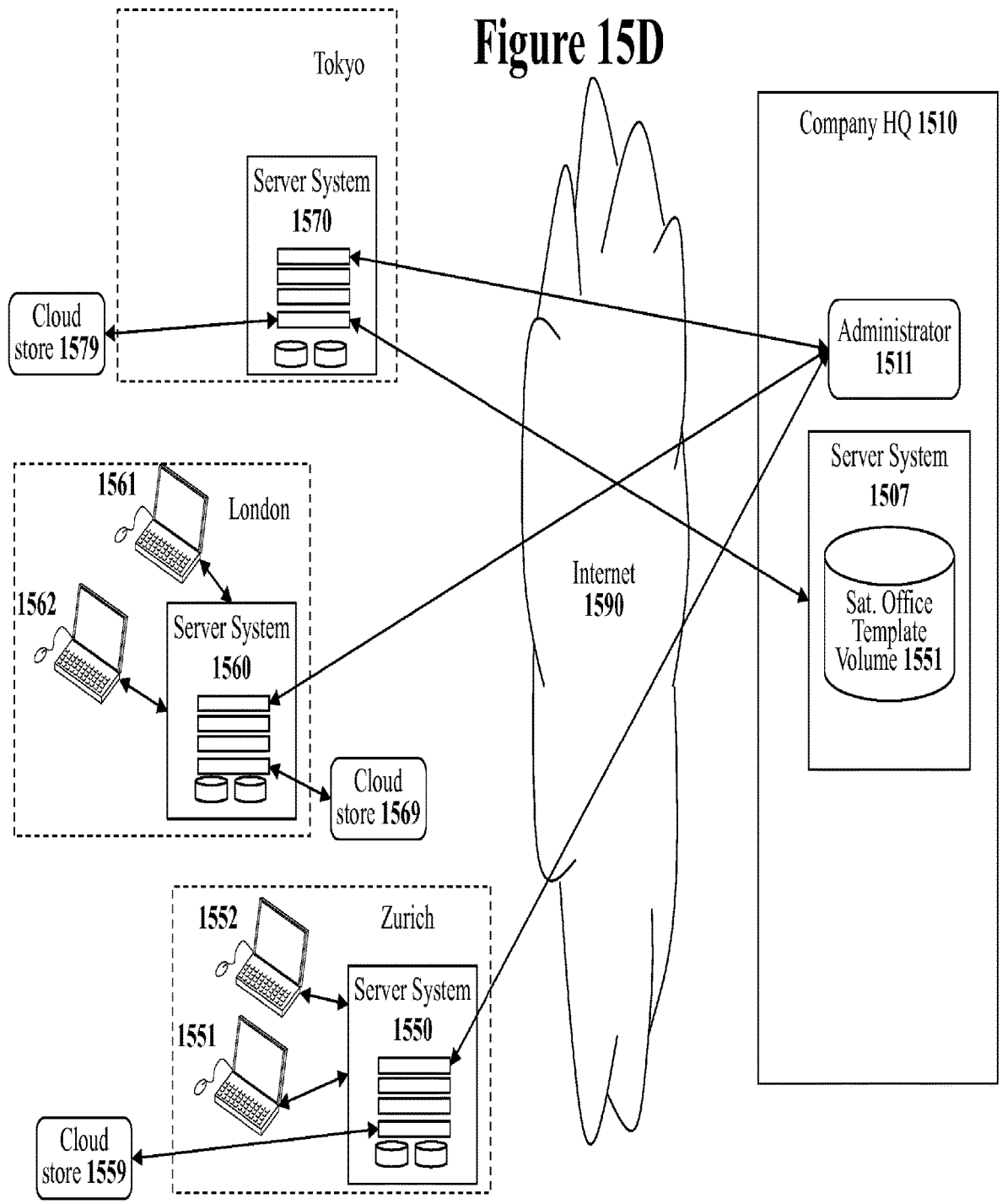
FIG. 15D illustrates the block diagram of FIG. 15C after configuring the restoring a satellite office template volume server onto the Tokyo server.

FIG. 15D illustrates the state of the Tokyo server system 1570 after restoring the satellite office template volume onto the Tokyo server system 1570 and creating other needed data volumes. Note that the satellite office template volume 1551 at the headquarters 1510 is only be used as back-up source volume. And that any changes made to the restored volume will only affect the local drive in the Tokyo server system 1570 and the cloud storage service 1579 used by the Tokyo server system 1570. Using conventional remote administration systems, the administrator 1511 may install and configure any server applications that are needed on the Tokyo server system 1570.

At this point, the Tokyo server system 1570 has been configure and loaded with applications ready for use. Thus, users at workstations 1571 and 1572 may begin using the Tokyo server system 1570 as illustrated in FIG. 15E. Note that the entire configuration process was able to be performed remotely by an administrator 1511 at the company headquarters 1510.

Figure 15F:
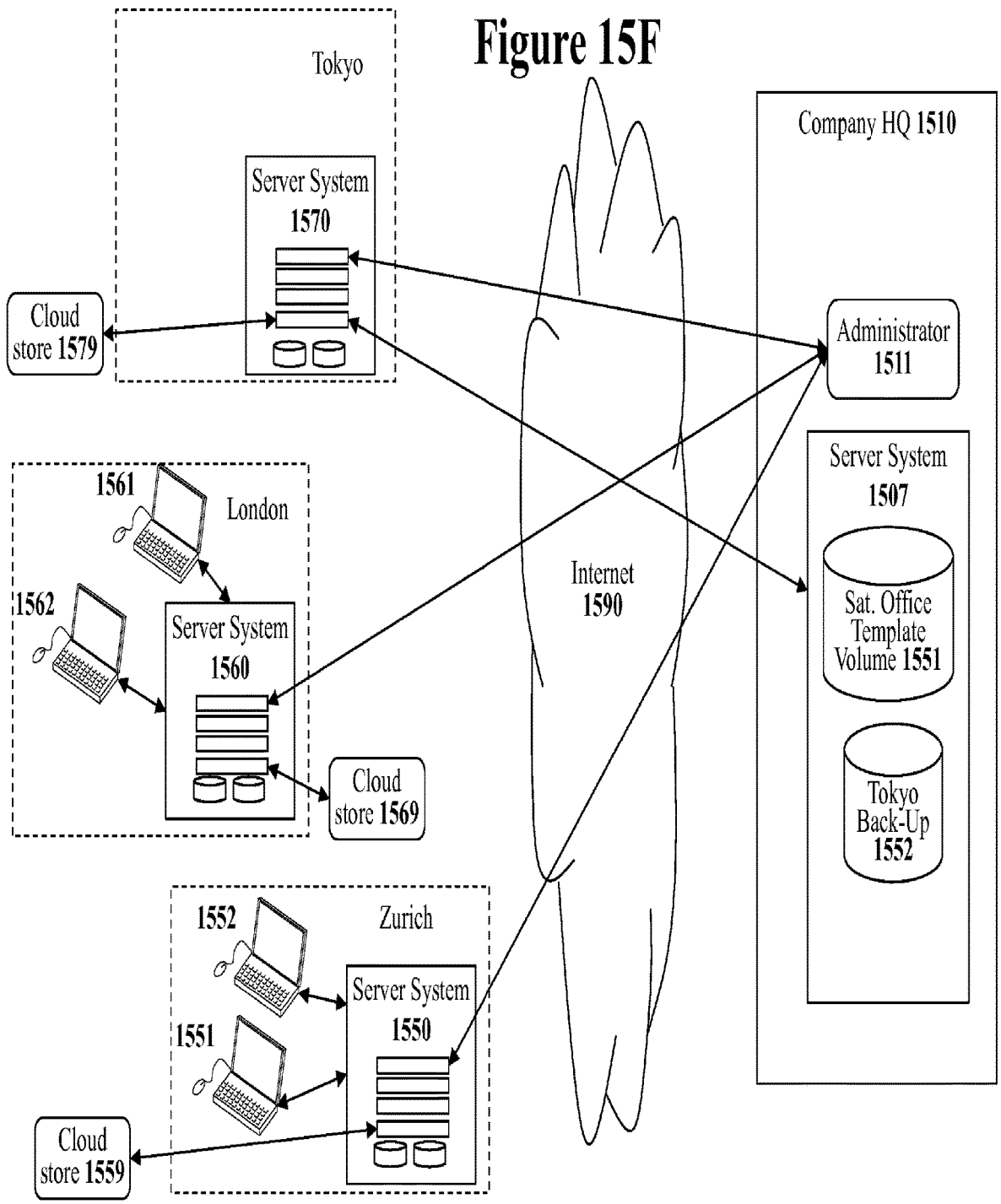
FIG. 15F illustrates the diagram of FIG. 15E after backing-up the important data volume from the Tokyo satellite office.

After a year, the Company may decide that Tokyo is not the most appropriate location for their far-east satellite office and may wish to move the office to Singapore. The server system 1570 with a hierarchical storage system can greatly facilitate this task of moving the office computer infrastructure. The first task is to have the administrator 1511 create a back-up of the needed data volumes from the Tokyo server system 1570. This may be performed by taking a snapshot of the needed volumes and then creating cloud-based back-ups of the snapshot volumes either at cloud store 1579 or at the company headquarters 1510. FIG. 15F illustrates a back-up 1552 of the server system 1570 from the closed Tokyo office at the server system 1507 in the company headquarters 1510.

Figure 15G:
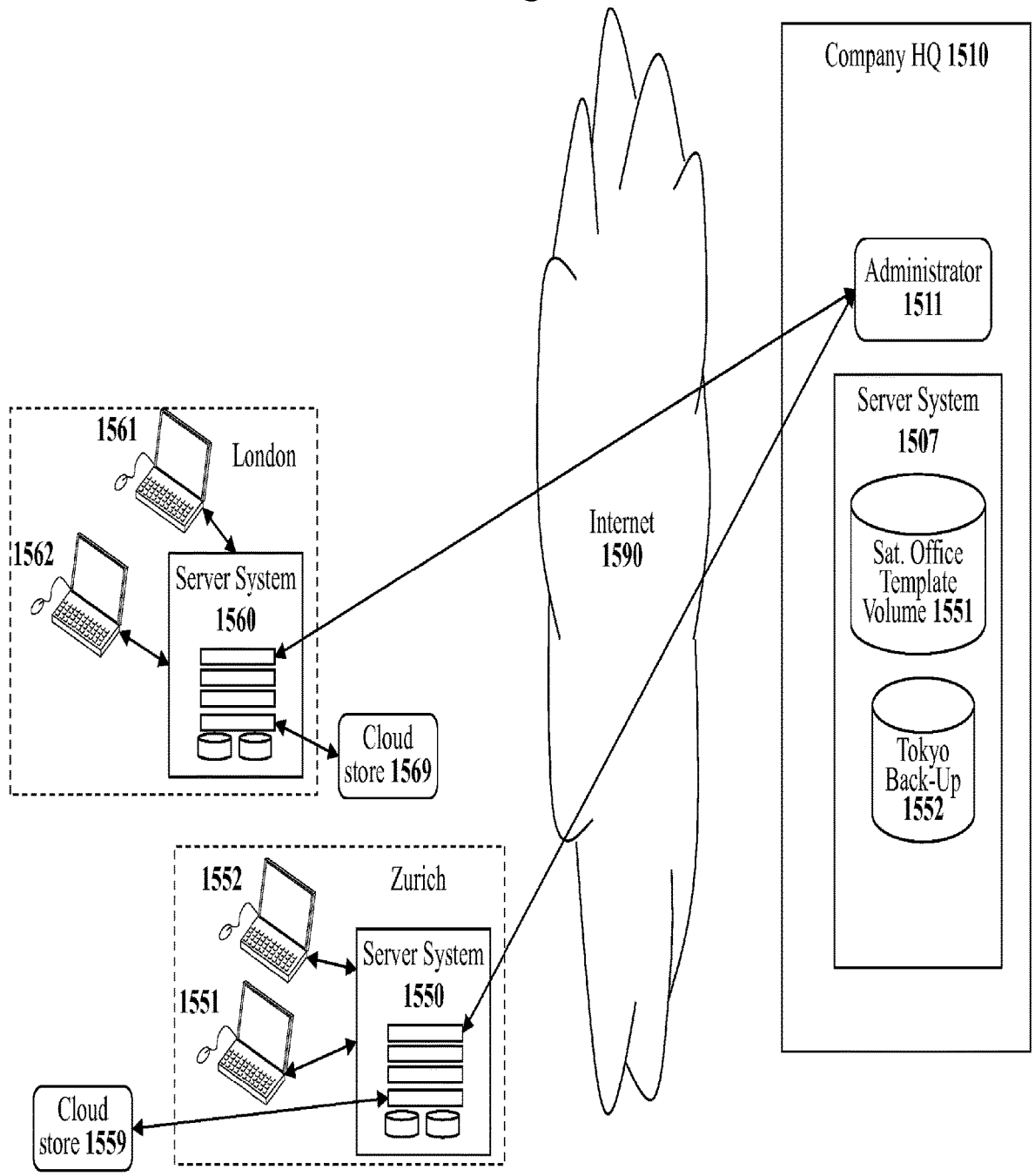
FIG. 15G illustrates the diagram of FIG. 15F after closing the Tokyo office.

Note that during the back-up process, all of the needed data from the regional cloud-storage system 1579 will be extracted and copied to the back-up 1552. Once all of the back-ups are complete, the Tokyo office may be closed down and the contract with the regional cloud-storage system 1579 may be terminated as illustrated in FIG. 15G. Note that the timing of such cloud provider change can be determined independently of the site transition and may happen at a later stage after the transition has completed. This allows for seamless transition on a permanent basis or in case of a temporary transition (e.g. in disaster recovery fail-over situation) allows restoration of original services at the Tokyo site as part of fail back.

Figure 15H:
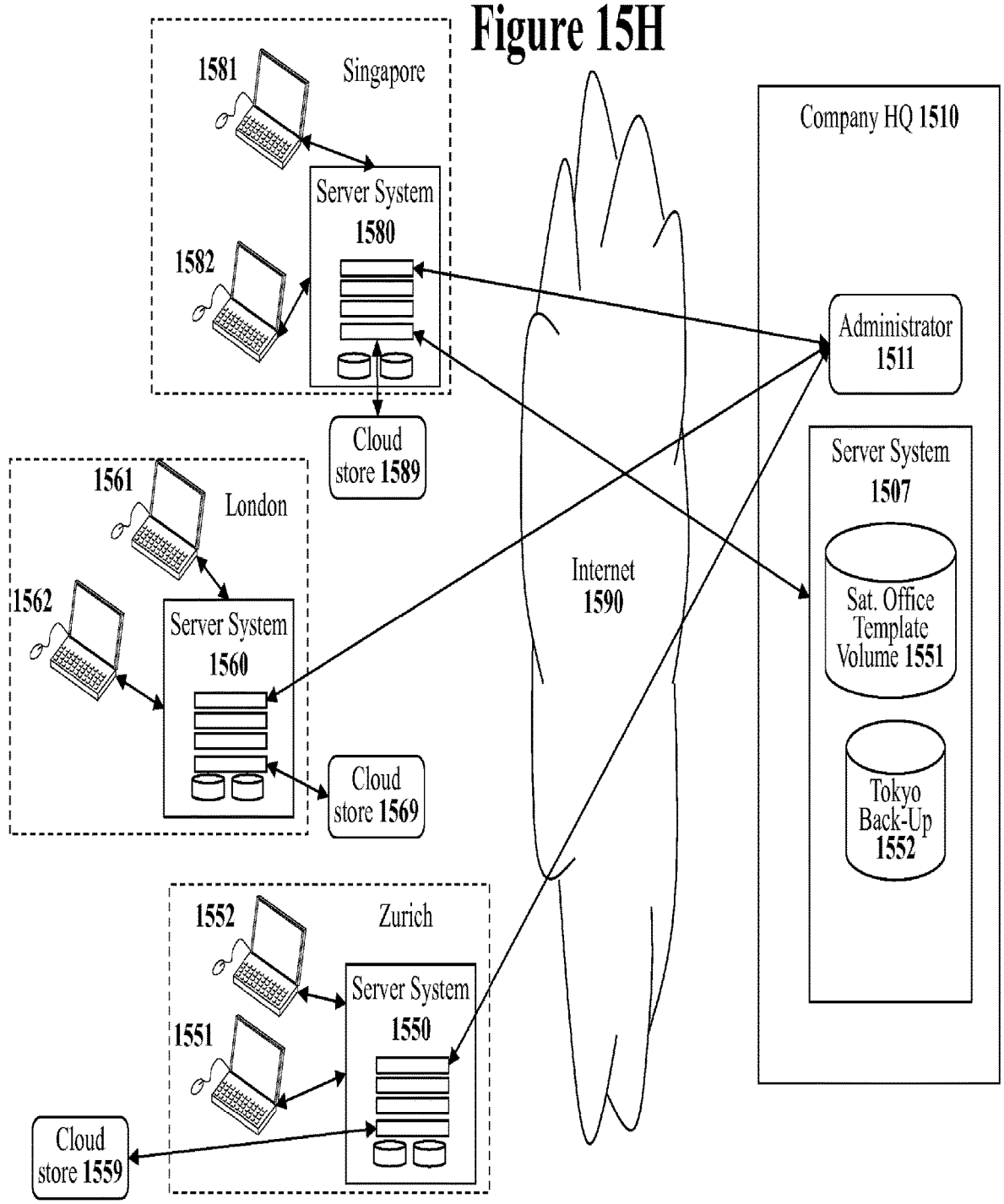
FIG. 15H illustrates the block diagram of FIG. 15G after opening up a new office in Singapore with all of the data from closed the Tokyo satellite office.

A new Singapore office may then be quickly open by following the same steps set forth with reference to FIG. 15A to 15E except that instead of restoring the satellite office template volume 1551, the administrator instead restores the Tokyo office back-up volume 1552 at the new Singapore office. The final outcome is illustrated in FIG. 15H. Note that if an unconfigured server system 1580 is set up and ready to go in the new Singapore office before the Tokyo office is closed down then the Tokyo server system 1570 can be backed-up immediately after the Tokyo office closes for the last day and immediately restored at the Singapore office. In this manner, the new Singapore office can open up the day after the Tokyo office closed with all of the data from the just-closed Tokyo office immediately available at the new Singapore office!

Figure 15I:
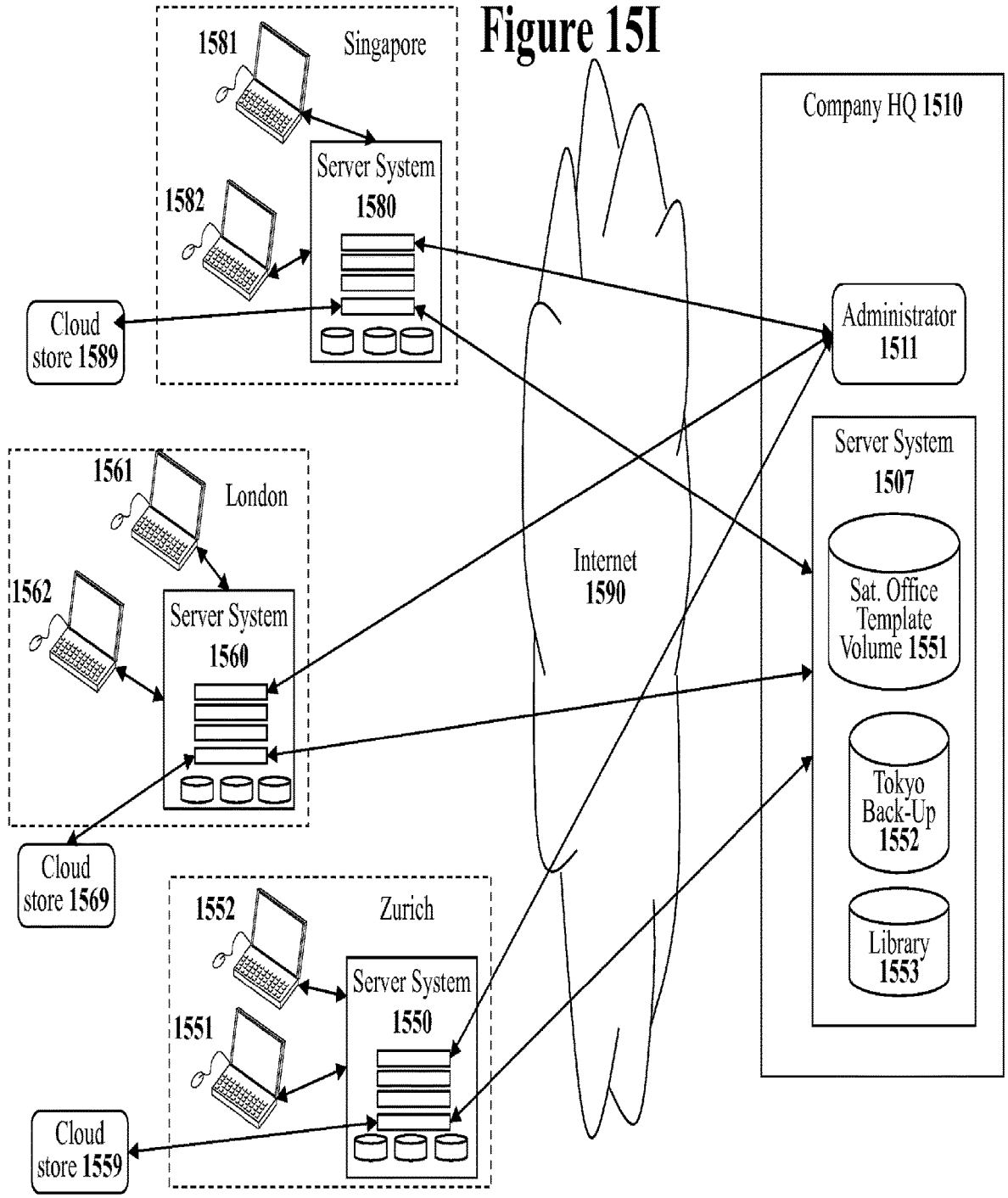
FIG. 15I illustrates the block diagram of FIG. 15H wherein a library volume is distributed to all of the different satellite offices.

The hierarchical storage systems can be used to easily distribute volumes of information to all of the different satellite office. Referring to FIG. 15I, the company headquarters 1510 has created a library volume 1553 as a back-up volume on server system 1507. The library volume 1553 contains information that the company headquarters would like distributed to all of the different satellite offices such as the company policy, information on the healthcare insurance, training videos, software licensed for use by all employees, etc. To distribute the library volume 1553 to all of the satellite offices, the administrator contacts each of the server systems 1550, 1560, and 1580 and instructs those servers to restore the library volume 1553 as a local volume. Each satellite server 1550, 1560, and 1580 will then create a local volume that contains all the information from the library volume 1553.

Note that all of the data from the library volume 1553 may not be immediately transmitted to all of the satellite servers (1550, 1560, and 1580). Instead, just an index of information needed to create the appearance of a local library volume 1553 is transmitted initially. Then, as users at the various satellite offices request documents from the local instance of the library volume, various pieces of the library volume 1553 will be transmitted as requested. This technique reduces unnecessary network bandwidth usage and does not waste local storage space for documents that no user will access.

Integrated Hierarchical Data Storage in the Cloud

There are times when even managing a single small physical server 1350 as illustrated in FIG. 13 may not be ideal. For example, if there are a number of individual salespeople working in distant geographical regions then there is no convenient central office to host a server for those remote salespeople. Alternatively, a company may decide to outsource the physical maintenance of all server hardware by just moving all server-based applications to a cloud-based computer service provider. To accomplish this goal, the server system 1400 with an integrated hierarchical storage system 1404 may be moved into a cloud-based virtual server. Ideally, the cloud-based computer service provider will be located at a geographical location relatively close to the users such that response times are optimized.

Figure 16:
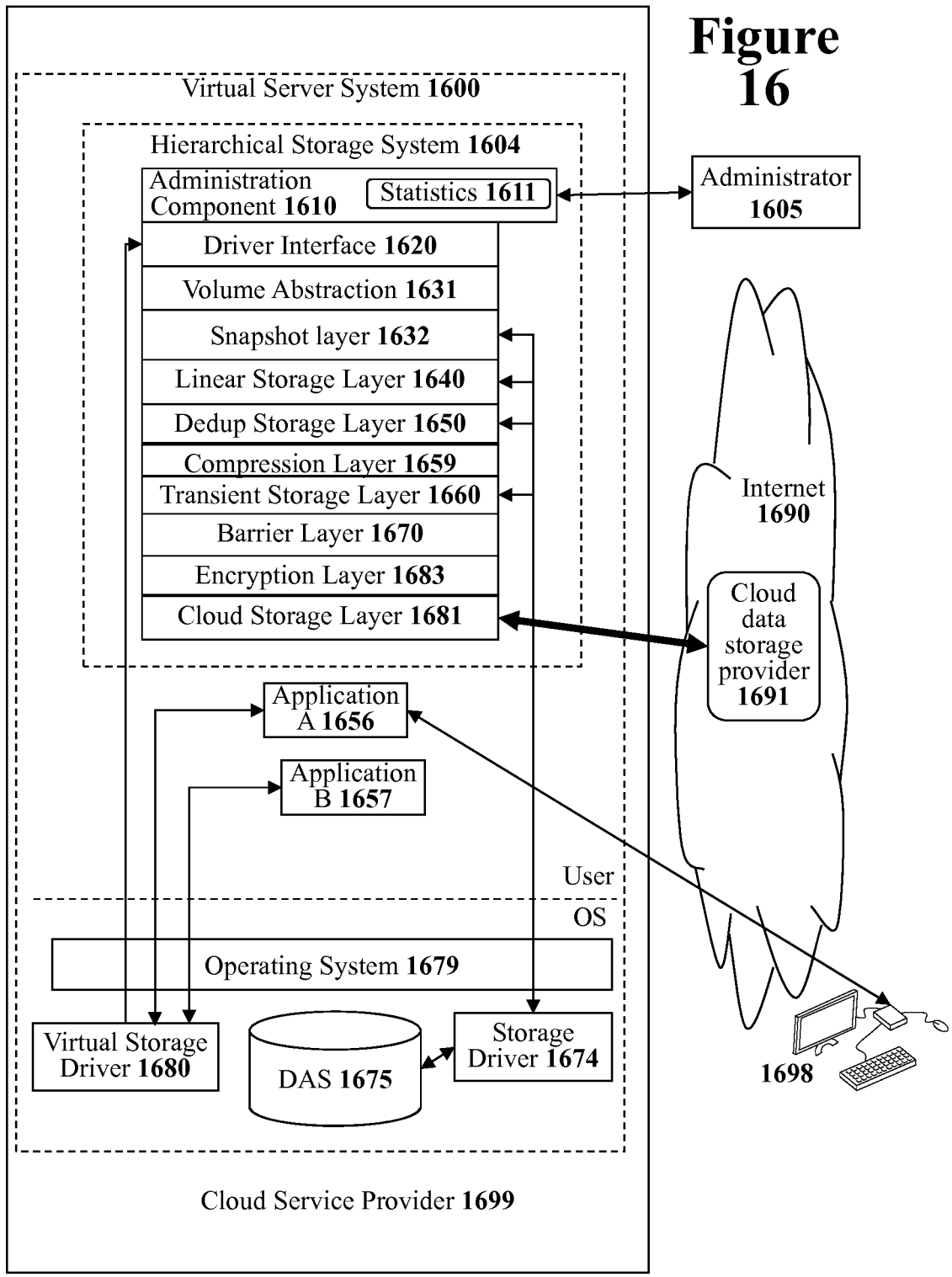
FIG. 16 illustrates a virtual server system with an integrated hierarchical storage system that is executing at a cloud service provider.

FIG. 16 illustrates a virtual server system 1600 with an integrated hierarchical storage system 1604 that is executing at a cloud service provider 1699. By moving the server system to a cloud-based service provider, an entity can eliminate and outsource all the tasks of physically maintaining server hardware. Individual users, such as a user at thin-client system 1698, may access server applications from the virtual server system 1600 across the interne 1690. Thus, many geographically remote individual users (such as geographically dispersed sales personnel) can all share server applications 1656 and 1656.

Note that within a cloud-based environment, the advantages of the different layers of the hierarchical storage system 1404 may not be appreciated as much. For example, when executing in a cloud-based environment, the linear storage layer 1640 may not have a very low latency response since the cloud-based environment may not support allocating certain regions of storage as solid state memory but will instead use disk storage as illustrated in FIG. 16. Thus, the storage size allocations and eviction policies used for the various storage layers may be adjusted to adapt to the cloud environment.

The virtual server system 1600 implementation of FIG. 16 uses the specialized virtual storage driver 1680 to provide storage services to application programs. Due to this architecture, any server applications that wish to use the hierarchical storage system 1604 must run on the same virtual server system 1600. For example, server applications A 1656 and B 1657 execute on the virtual server system 1600 and thus can access the virtual storage driver 1680 in that virtual server system 1600. To improve performance, each application program may be assigned its own individual virtual machine.

Figure 17:
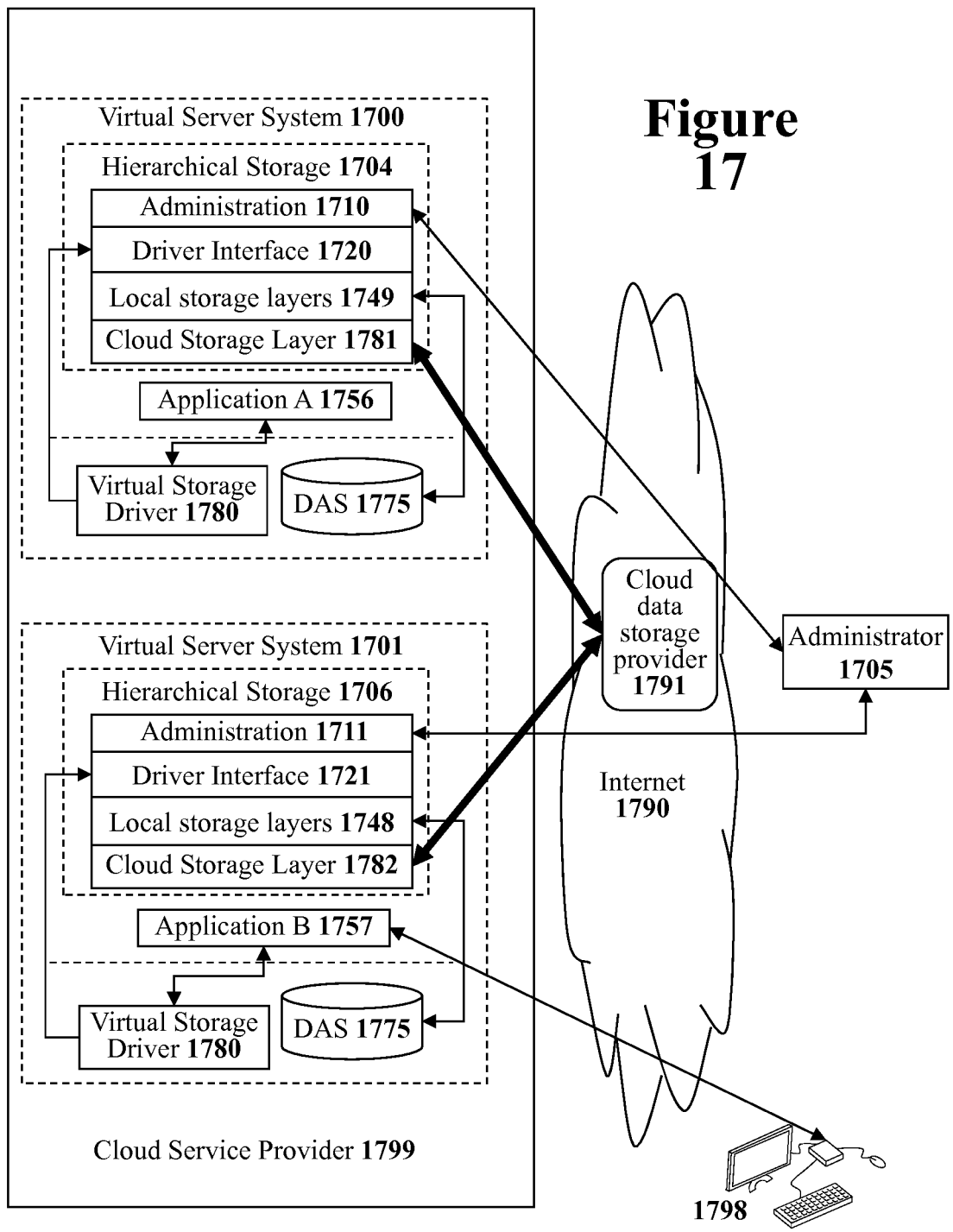
FIG. 17 illustrates two virtual server systems with an integrated hierarchical storage system that are executing at a cloud service provider.

FIG. 17 illustrates a cloud service provider 1799 that is running two separate virtual server systems (1700 and 1701) wherein each server system is running a single server application (1756 and 1757, respectively). Additional virtual servers may be spawned to handle additional applications wherein each virtual server has its own hierarchical storage system instance. This arrangement allows the system to take advantage of the cloud computing aspect of being about to scale out instead of scale up. Specifically, multiple different computer instances may be assigned handle individual tasks instead of using a single large computer instance that runs multiple disparate applications. Thus, for similar tasks, a system may use a cluster of smaller nodes that can grow or shrink in members, rather than one large compute node that consumes a predefined set of resources.

Figure 18:
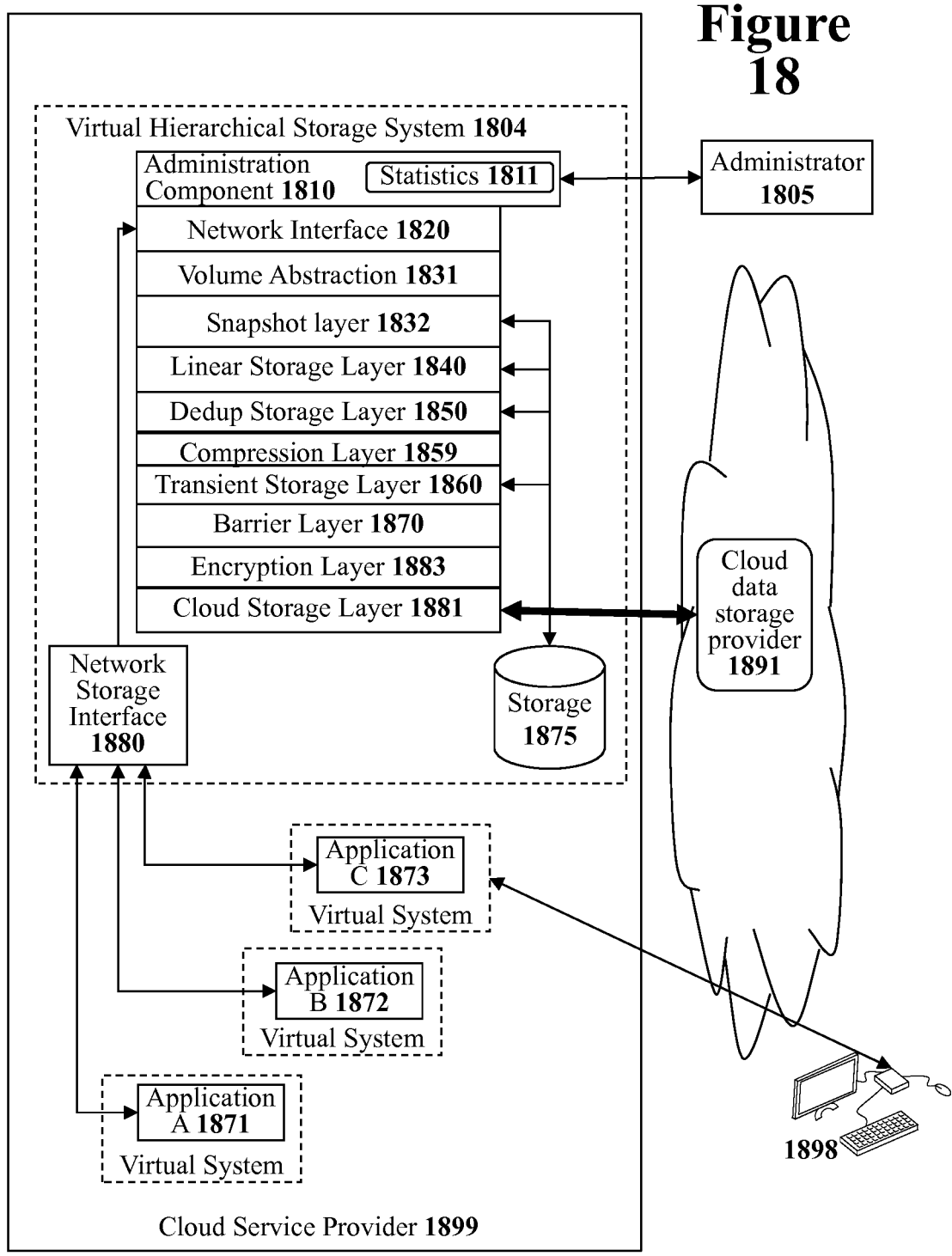
FIG. 18 illustrates a virtual hierarchical storage system with a network storage interface that is executing at a cloud service provider.

In an alternate embodiment, the hierarchical storage system may be generalized to allow other applications running on other machines (real or virtual) to more easily access the cloud-based hierarchical storage system. FIG. 18 illustrates a virtual hierarchical storage system 1804 that is executing at a cloud service provider 1899. However, the virtual hierarchical storage system 1804 exposes a network storage interface 1880 such as an iSCSI interface to the outside world. In this manner, server applications A 1871, B 1872, and C 1873 can run in their own virtual systems (or on physical system at an office) and access the storage services through the network storage interface 1880. An individual user at thin-client system 1898 is illustrated accessing the server application C 1873 across the internet 1890.

Note that the embodiment of FIG. 18 makes it easier to scale up applications services faster. Specifically, as many instances of applications are necessary may be created in their own virtual servers and allowed to access the same network storage interface 1880 such that when processing power is needed to handle numerous simultaneous users, application processing power can be scaled up quickly.

Disaster Recovery Using Data Storage in the Cloud

The ability to host a virtual hierarchical storage system 1804 within cloud-based service provider 1899 offers the ability to create a low-cost disaster recovery system for any entity that uses a hierarchical storage system. With either the hierarchical storage appliance 460 of FIG. 4 or integrated hierarchical storage server 1350 of FIG. 13, an administrator can easily create daily back-up volumes stored at the cloud storage provider used by the hierarchical storage system. Thus, if a disaster strikes (such as an office building housing the hierarchical storage appliance 460 or integrated hierarchical storage server 1350 burns down), the most recent back-up volume can be restored into cloud-based virtual hierarchical storage system 1804 at cloud service provider 1899. Once the back-up data volumes are restored at a virtual hierarchical storage system 1804, cloud-based application programs such as applications 1871, 1872, and 1873 may begin operating using the restored data volumes.

Thus, simply by creating regular cloud-based back-up volumes, any organization that uses a hierarchical storage system has the ability to quickly restore an entire back-office infrastructure within a cloud service provider 1899. The stand-by disaster recovery effectively costs nothing to maintain since an account with a cloud service provider 1899 can immediately be open when a disaster strikes.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
   in a system connected to a network connection and comprising a hierarchical storage stack for storing data, wherein the hierarchical storage stack comprises a local data storage layer for storing data locally in the system and a remote data storage layer that stores data with a remote data storage service;
   receiving a request to back-up a data volume;
   creating a snapshot volume of the data volume in the system, wherein the snapshot volume comprises a set of data chunks and wherein creating the snapshot volume comprises:
      dividing a first set of data chunks into a first set of data slices, creating a first set of data slice fingerprints for said first set of data slices, and placing said first set of fingerprints in said fingerprint data map; and
      copying a second set of existing data slice fingerprints for a second set of existing data slices from a second set of data chunks in said snapshot volume; and
   copying data from the snapshot volume stored in the local data storage layer to the remote data storage service.

2. The method of claim 1, further comprising:
   receiving a request to create a new data volume in the system;

allocating the new data volume in the hierarchical storage stack; and creating storage space for the new data volume by transferring data from the local data storage layer to the remote data storage layer.

3. The method of claim 1, further comprising:

receiving a request to restore a data volume;

copying a data volume snapshot index into the hierarchical storage stack to create a restored data volume, the data volume snapshot index referencing data in a remote server; and copying data from the remote server as data in the restored data volume is requested by local users of the system.

4. The method of claim 1, further comprising:

collecting operation statistics, wherein the operation statistics comprise a count of a number of times a data chunk has been accessed.

5. The method of claim 1, wherein the remote data storage service comprises a cloud-based virtual server.

6. A system comprising:

a processor;

a network interface;

a hierarchical storage stack for storing data comprising at least one local data storage layer for storing data locally in the system and a remote data storage layer that stores data with a remote data storage service; and memory storing instructions storing a set of computer-executable instructions that, when executed by the processor, cause the system to perform the operations of:

receiving a request to back-up a data volume;

creating a snapshot volume of the data volume in the local data storage layer, wherein the snapshot volume comprises data chunks;

creating a fingerprint of the snapshot volume by:

dividing a first set of the data chunks into a first set of data slices, creating a first set of data slice fingerprints for the first set of data slices, and placing the first set of fingerprints in a fingerprint data map; and copying a second set of existing data slice fingerprints for a second set of existing data slices from a second set of the data chunks in the snapshot volume; and copying data from the snapshot volume to the remote data storage layer.

7. The system of claim 6, wherein the at least one local data storage layer comprises a first local data storage layer that stores data in a solid-state memory system and a second local data storage layer that stores data on a hard disk drive.

8. The system as set forth in claim 6, wherein the at least one local data storage layer comprises a first local data storage layer that stores data in a raw format and a second local data storage layer that stores data in a format with duplicate data removed.

9. The system of claim 6, wherein the remote data storage service comprises an off-site data storage provider.

10. The system of claim 6, wherein an administration component periodically polls the at least one local data storage layer and the remote data storage layer to generate statistics representing performance of the hierarchical storage stack.

11. The system of claim 6, wherein the hierarchical storage stack further comprises a storage area network (SAN) interface layer that receives storage requests from local systems in the SAN.

12. The system of claim 11, wherein the SAN layer uses at least one of the Internet Small Computer System Interface (iSCSI) protocol or the Fiber Channel Protocol (FCP) clients to perform at least one of start, stop, read, write, or format operations on data storage units.

13. The system of claim 6, wherein the hierarchical storage stack further comprises a volume abstraction layer that handles volume management tasks including at least one of tracking data volumes that exist, tracking sizes of individual data volumes, or maintaining access control lists (ACLs).

14. A non-transitory computer-readable medium storing a set of computer-executable instructions that, when executed by a processor, cause a computing device to perform the operations of:

installing a system comprising a hierarchical storage stack for storing data, the hierarchical storage stack comprising a local data storage layer for storing data locally in the system and a remote data storage layer that stores data with a remote data storage service;

receiving a request to back-up a data volume;

creating a snapshot volume of the data volume in the local data storage layer, wherein the snapshot volume comprises data chunks;

creating a fingerprint of the snapshot volume by:

dividing a first set of the data chunks into a first set of data slices, creating a first set of data slice fingerprints for the first set of data slices, and placing the first set of fingerprints in a fingerprint data map; and copying a second set of existing data slice fingerprints for a second set of existing data slices from a second set of the data chunks in the snapshot volume; and copying data from the snapshot volume in the local data storage layer to the remote data storage layer.

15. The non-transitory computer-readable medium as set forth in claim 14, wherein the hierarchical storage stack further comprises administration layer that allows remote configuration and control of the hierarchal storage stack and the instructions further cause the computing device to perform the operations of:

receiving in the administration layer a remote access request, wherein the remote access request is a request to create a new data volume in the system;

allocating the new data volume in the hierarchical storage stack; and creating storage space for the new data volume by transferring data from the at least one local data storage layer to the remote data storage layer that stores data with the remote data storage service.

16. The non-transitory computer-readable medium as set forth in claim 14, wherein the hierarchical storage stack further comprises administration layer that allows remote configuration and control of the hierarchal storage stack and the instructions further cause the computing device to perform the operations of:

receiving in the administration layer a remote access request, wherein the remote access request is a request to restore a data volume;

copying a data volume snapshot index into the hierarchical storage stack to create a restored data volume, the data volume snapshot index referencing data in a remote server; and copying data from the remote server as data in the restored data volume is requested by users of the system.

17. The non-transitory computer-readable medium as set forth in claim 14, wherein the hierarchical storage stack further comprises administration layer that allows remote configuration and control of the hierarchal storage stack and the instructions further cause the computing device to perform the operations of:

receiving in the administration layer a remote access request, wherein the remote access request is a request to back-up a data volume in the system;

creating a snapshot volume of the data volume in the system; and copying data from the snapshot volume stored in the at least one local data storage layer to the remote data storage service.

18. The system of claim 6, wherein the computer-executable instructions further cause the system to perform the operations of:

receiving a request to create a new data volume in the system;

allocating the new data volume in the hierarchical storage stack; and creating storage space for the new data volume by transferring data from the at least one local data storage layer to the remote data storage layer that stores data with the remote data storage service.

19. The system of claim 6, wherein the computer-executable instructions further cause the system to perform the operations of:

receiving a request to restore a data volume;

copying a data volume snapshot index into the hierarchical storage stack to create a restored data volume, the data volume snapshot index referencing data in a remote server; and copying data from the remote server as data in the restored data volume is requested by users of the system.

20. The system of claim 6, wherein the computer-executable instructions further cause the system to perform the operations of:

receiving a request to back-up a data volume in the system;

creating a snapshot volume of the data volume in the system; and copying data from the snapshot volume stored in the at least one local data storage layer to the remote data storage service.

* * * * *